United States Patent
Roberts et al.

(10) Patent No.: US 9,862,269 B2
(45) Date of Patent: Jan. 9, 2018

(54) CARRIER BEARING ASSEMBLY

(71) Applicants: Jonathan D Roberts, Glendale, AZ (US); Brent G Reynolds, Phoenix, AZ (US)

(72) Inventors: Jonathan D Roberts, Glendale, AZ (US); Brent G Reynolds, Phoenix, AZ (US)

( * ) Notice: Subject to any disclaimer, the term of this patent is extended or adjusted under 35 U.S.C. 154(b) by 0 days.

(21) Appl. No.: 15/449,483

(22) Filed: Mar. 3, 2017

(65) Prior Publication Data

US 2017/0174077 A1 Jun. 22, 2017

Related U.S. Application Data

(63) Continuation-in-part of application No. 14/952,741, filed on Nov. 25, 2015.

(51) Int. Cl.
| | |
|---|---|
| *B60K 17/24* | (2006.01) |
| *F16C 35/04* | (2006.01) |
| *F16C 33/66* | (2006.01) |
| *F16C 35/06* | (2006.01) |

(52) U.S. Cl.
CPC .......... *B60K 17/24* (2013.01); *F16C 33/6622* (2013.01); *F16C 35/042* (2013.01); *F16C 35/06* (2013.01); *F16C 2326/06* (2013.01)

(58) Field of Classification Search
CPC ...... F16C 35/042; F16C 35/047; F16C 35/06; F16C 35/07; B60K 17/22; B60K 17/24
See application file for complete search history.

(56) References Cited

U.S. PATENT DOCUMENTS

| | | | | | |
|---|---|---|---|---|---|
| 3,003,831 | A * | 10/1961 | King | ............... | B60K 17/24 180/381 |
| 3,981,550 | A * | 9/1976 | Zimmer | ............... | F16C 23/084 384/558 |
| 5,172,985 | A * | 12/1992 | Constancio | ............ | F16C 27/066 384/536 |
| 5,208,981 | A * | 5/1993 | Puzsik | ............. | B29C 33/123 264/263 |
| 8,132,640 | B2 * | 3/2012 | Heitkamp | ............. | B60K 17/24 180/232 |
| 8,544,591 | B2 * | 10/2013 | Felchner | ............... | F16F 1/3849 180/312 |
| 2003/0236122 | A1 * | 12/2003 | Blumke | ............. | F16D 3/70 464/178 |

FOREIGN PATENT DOCUMENTS

DE 2908709 * 9/1980

* cited by examiner

*Primary Examiner* — James Pilkington
(74) *Attorney, Agent, or Firm* — Booth Udall Fuller, PLC

(57) ABSTRACT

A carrier bearing assembly for bolting to a frame of a utility terrain vehicle (UTV) can include a bracket comprising a first end, a second end, a width W extending between the first end and the second end, and first and second faces extending between the first end and the second end along the width W of the bracket. An opening can be formed completely through the bracket and extend from the first face to the second face, a centerline of the opening being at least 2.5 cm closer to the first end than the second end, and an angle between the opening and the bracket being in a range of 85-89° or 91-95°. A bearing can be fit in the opening and a rubber bushing can be disposed between the bracket and the bearing. First and second bolt openings can extend into the bracket.

15 Claims, 23 Drawing Sheets

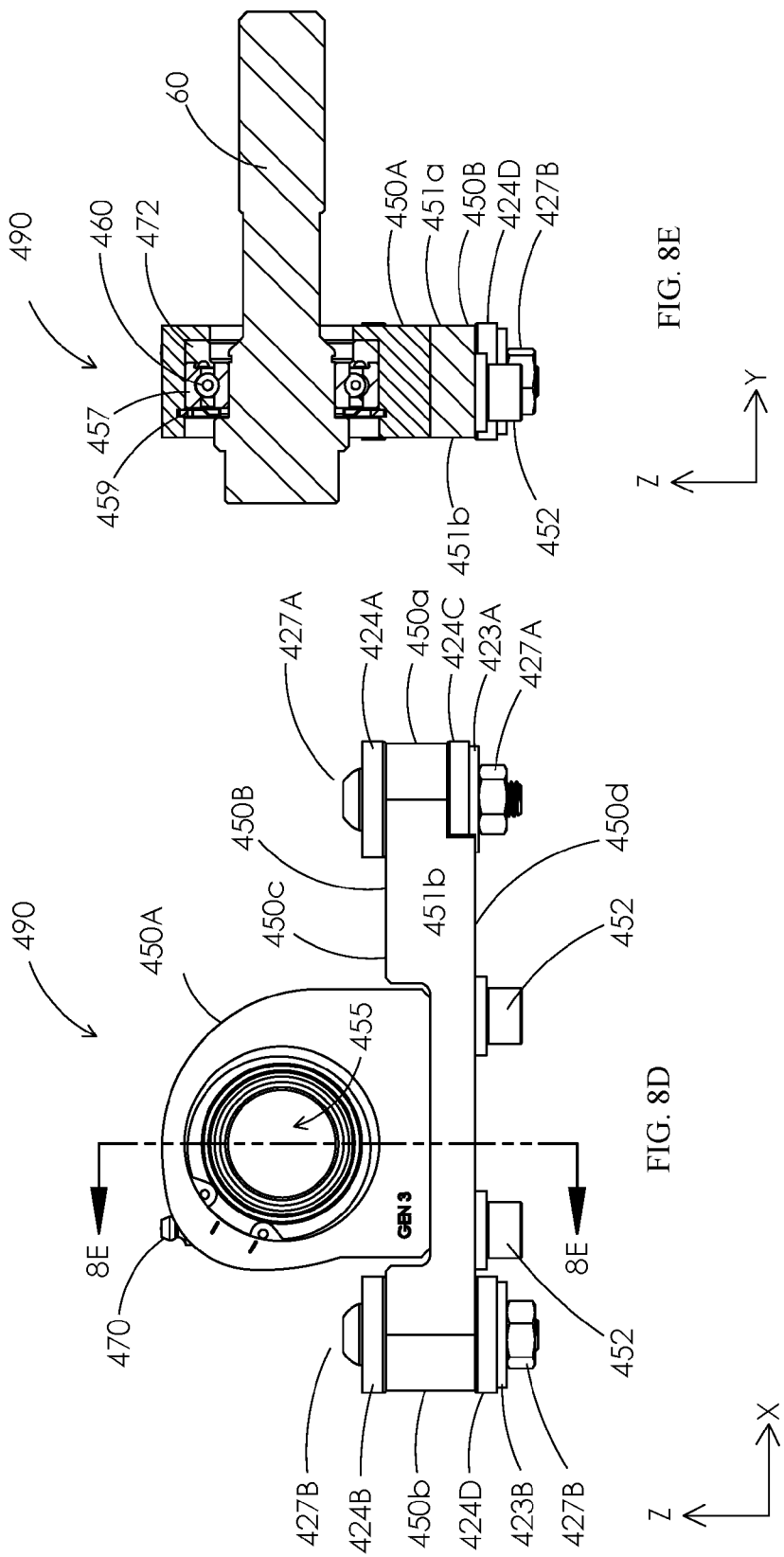

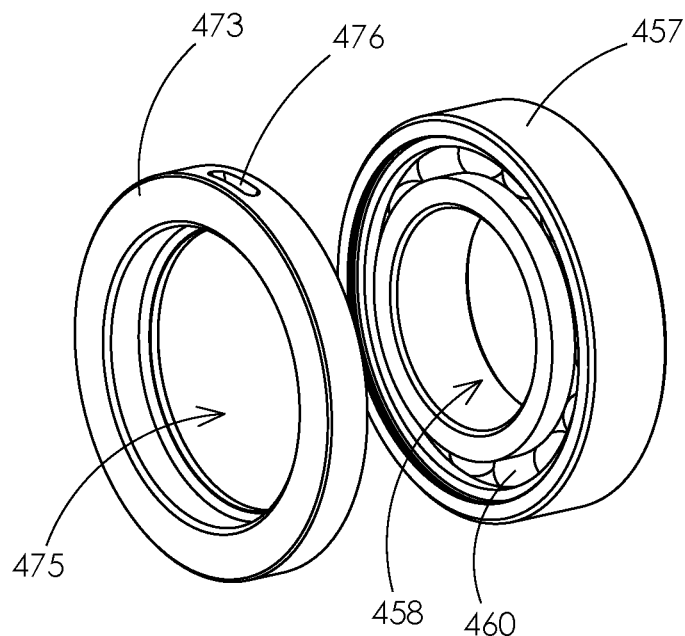
FIG. 9B
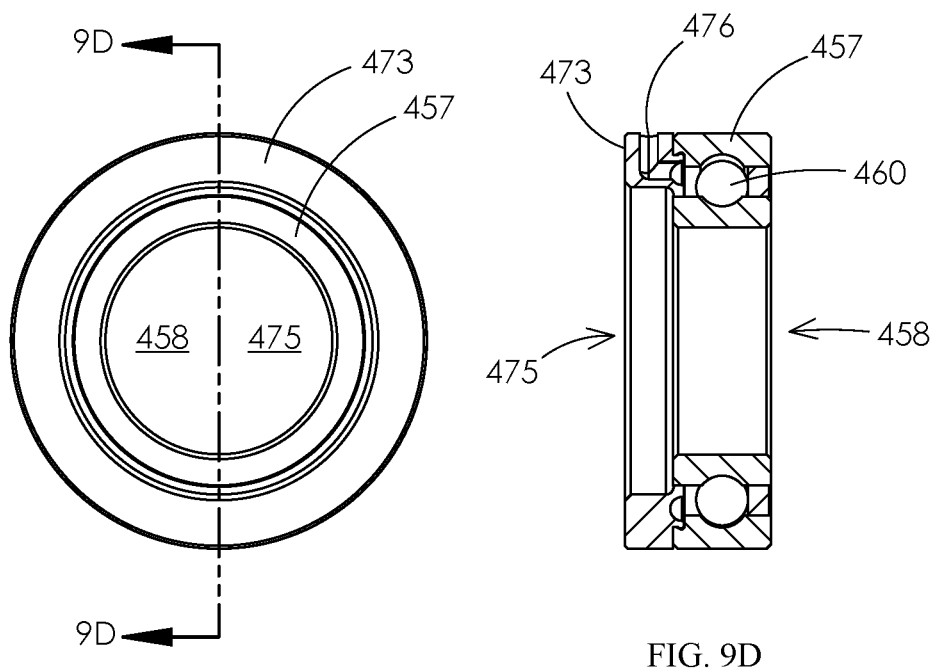
FIG. 9C
FIG. 9D

CARRIER BEARING ASSEMBLY

RELATED APPLICATIONS

This application is a continuation-in-part of U.S. patent application Ser. No. 14/952,741, filed Nov. 25, 2015 titled "Carrier Bearing Assembly," the entirety of the disclosure of which is hereby incorporated by this reference.

TECHNICAL FIELD

The present disclosure relates to a carrier bearing assembly useful for reducing driveshaft vibration, noise, and stress.

BACKGROUND

A universal joint (U-joint) is a type of coupling that can be attached to a shaft to allow the shaft to rotate and transmit rotational motion in other than a straight line, such as by coupling together multiple shaft segments that allows the segments shaft to bend, turn, or accommodated non linear paths while transmitting torque, rotary motion, or both between the shaft segments and opposing ends of the shaft. Rotating shafts or elements transmitting torque are present in many applications, and are also in use in vehicles, such as automobiles, trucks, tractors, machinery, and equipment. For example, on vehicles where the engine is located on a different end from the drive wheels, such as on rear-wheel drive trucks, and on many 4-wheel drive vehicles, a driveshaft is used transfer torque from the engine and transmission to the drive wheels. To permit variations in alignment, a driveshaft typically incorporates several universal joints (U-joints).

FIG. 1 illustrates the concept of operating angles of a shaft having multiple U-joints. As shown in FIG. 1, a first shaft segment 1 is coupled to a second shaft segment 2 using a first U-joint A, and the second shaft segment 2 is coupled to a third shaft segment 3 using a second U-joint B. As illustrated, each shaft segment is coupled to another at an angle, called the operating angle. For instance, the operating angle between the first shaft segment 1 and the second shaft segment 2 is a degrees (a°) and the operating angle between the first shaft segment 2 and the third shaft segment 3 is b degrees (b°). It is known in the art that when U-joints are used to accommodate operating angles a° and b° and the operating angles a° and b° are the same, the rotational speed of the first shaft segment 1 and the third shaft segment 3 will also be the same. Additionally, when the operating angles a° and b° are the same and the first shaft segment 1 is rotated at a constant rate, the third shaft segment 3 will also rotate at a constant rate.

SUMMARY

A need exists for an improved carrier bearing for bolting to a frame of a utility terrain vehicle (UTV). Accordingly, in an aspect, a carrier bearing assembly for bolting to a frame of a UTV can comprise a bracket comprising a first end, a second end, a width W extending between the first end and the second end, a first face extending between the first end and the second end along the width W, and a second face opposite the first face extending between the first end and the second end along the width of the bracket. An opening can be formed completely through the bracket and extend from the first face to the second face, a centerline of the opening being at least 2.5 cm closer to the first end than the second end, and an angle between the opening and the bracket being in a range of 85-89° or 91-95°. A bearing can be friction fit in the opening in the bracket. A rubber bushing can be disposed between the bracket and the bearing. First and second fastener members can comprise first and second openings extending into the first end and the second end of the bracket, respectively, and first and second bolts for coupling to the frame of the UTV and extending into the first and second bolt openings.

The carrier bearing can further comprise the angle between the opening and the bracket being measured with respect to a centerline of the bracket. The first face of the bracket can comprise a bend comprising an angle greater than 1°, the bend being offset from the opening. The bracket can comprise a machined bracket formed as single, unitary block of metal. The bracket can comprise an upper integrally formed machined bracket component and a lower integrally formed machined bracket component. The carrier bearing assembly can further comprise a zerk and bearing sleeve that allows the carrier bearing assembly to be greased while in use. A gap of no more than 0.254 millimeters can exist between an inner surface of an opening in the bearing and an outer surface of a driveshaft disposed through the opening in the bearing.

In another aspect, a carrier bearing assembly for bolting to a frame of a UTV can comprise a bracket comprising a first end, a second end, a width W extending between the first end and the second end, a first face extending between the first end and the second end along the length of the width W, and a second face opposite the first face extending between the first end and the second end along the width of the bracket. An opening can be formed completely through the bracket and extend from the first face to the second face, a centerline of the opening being closer to the first end than the second end, and an angle between the opening and the bracket being in a range of 85-89° or 91-95°. First and second fastener members can be offset from the opening for coupling the carrier bearing assembly to the frame of the UTV.

The carrier bearing assembly can further comprise the angle between the opening and the bracket being measured with respect to a centerline of the bracket passing through centers of the first and second fastener openings. The bracket can comprise a machined bracket. A bearing can be fit in the opening in the bracket, and a gap of no more than 0.254 millimeters can exist between an inner surface of an opening in the bearing and an outer surface of a driveshaft disposed through the opening in the bearing. A rubber bushing can be disposed between the bracket and the bearing. The carrier bearing can be fastened over or under the frame of the UTV. The carrier bearing assembly can further comprise a zerk that allows the carrier bearing assembly to be greased while in use.

In another aspect, a carrier bearing assembly for bolting to a frame of a UTV can comprise a bracket comprising a first end, a second end, a width W extending between the first end and the second end, a first face extending between the first end and the second end along the length of the width W, and a second face opposite the first face extending between the first end and the second end along the width of the bracket. An opening can be formed completely through the bracket and extend from the first face to the second face. A can be bearing disposed within the opening at an auto set angle. At least one fastener member can be used for coupling the carrier bearing assembly to the frame of the UTV.

The carrier bearing can further comprise the auto set angle between the bearing and the bracket being less than 89° or greater than 91°. The angle between the opening and the bracket can be measured with respect to the first face or second face of the bracket. A zerk can be used that allows the carrier bearing assembly to be greased while in use. The bracket can comprise an upper integrally formed machined bracket component and a lower integrally formed machined bracket component. A bearing can be fit in the opening in the bracket, and a rubber bushing can be disposed between the bracket and the bearing.

BRIEF DESCRIPTION OF THE DRAWINGS

FIGS. 8A-8H illustrate various views of another embodiment of a carrier bearing assembly.

FIGS. 9A-9G illustrate a greasable bearing and bearing shield away from a carrier bearing assembly.

DETAILED DESCRIPTION OF THE INVENTION

Figure 1:
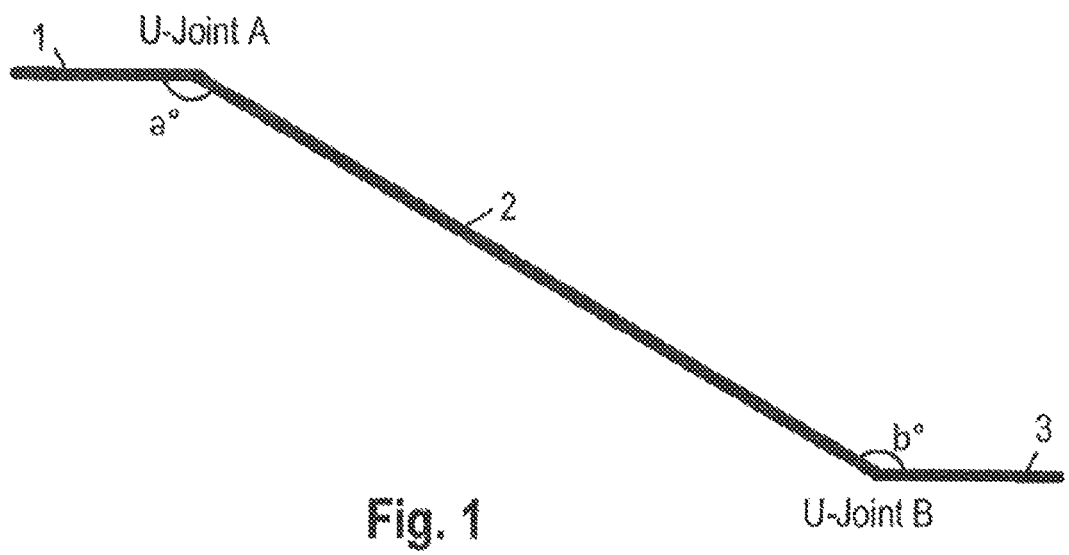
FIG. 1 is a diagram illustrating operating angles of a bent shaft having universal joint (U-joint) couplings.

This disclosure, its aspects and implementations, are not limited to the specific material types, or other system component examples, or methods disclosed herein. Many additional components, manufacturing and assembly procedures known in the art consistent with its manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in different forms, there is shown in the drawings and will herein be described in detail, particular embodiments. As such, the disclosure is presented with the understanding that the disclosure is to be considered as an exemplification of the principles of the disclosed structures, methods, and systems, and is not intended to limit the broad aspect of the disclosed concepts to the embodiments illustrated.

With reference to the conventional structure show in FIG. 1, Applicant has additionally observed that when the operating angles a° and b° are about the same, the rotational speed of the first shaft segment 1 and the third shaft segment 3 will also be about the same. Similarly, when the operating angles a° and b° are about the same and the first shaft segment 1 is rotated at a constant rate, the third shaft segment 3 will also rotate at a constant rate. However, where the operating angles a° and b° are different, a rate or rotation or angular velocity for the first shaft segment 1 and the third shaft segment 3 will be different. For example, if the first shaft segment 1 rotates with a first angular velocity, then with operating angles a° and b° being different, the angular velocity of the third shaft segment 3 will be different than the rate of rotation or angular velocity of the first shaft segment 1. As a result, as the angular velocity of the first shaft segment 1 varies, the angular velocity of the third shaft segment 3 will also vary and will be continually accelerating/decelerating according to the changes in the angular velocity of the first segment. When the differences in operating angles a° and b° are significant, such as greater than or equal to 1 degree or 2 degrees, the corresponding differences in angular velocity are also significant, then as a result, Applicant has observed that vibrations result in the first, second, and third shaft segments 1, 2, and 3, respectively. The vibrations in the shaft segments can undesirably introduce dynamic loading, stresses, and strains on vehicle components, including all of the driveline components, which can cause early or premature failure on vehicle components, as well as reduced efficiency in vehicle performance, and make operation of the vehicle less smooth and less comfortable.

Figure 2:
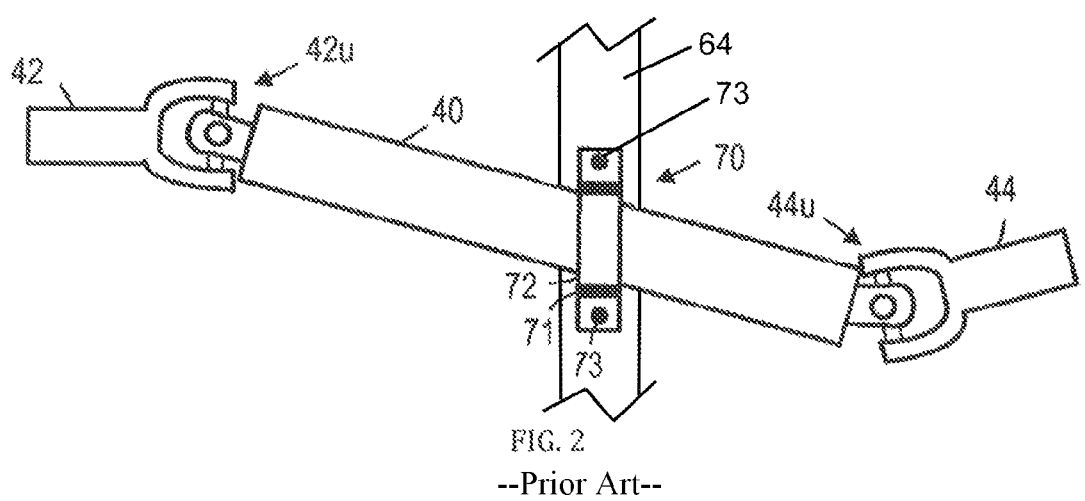
FIG. 2 illustrates a driveshaft of a vehicle with non-optimally aligned U-joints employing a conventional carrier bearing assembly.

FIG. 2 illustrates a driveshaft comprising a first shaft segment 42, a second shaft segment 40, and a third shaft segment 44, similar to the shaft segments shown and described with respect to FIG. 1. However, FIG. 2 shows the shaft segments and U-joints in additional detail, rather than only diagrammatically as shown in FIG. 1. The shaft segments in FIG. 2 are shown with unequal or non-optimal operating angles between the first shaft segment 42 and the second shaft segment 40, as well as between the second shaft segment 40 and the third shaft segment 44. While the driveshaft shown in FIG. 2 has, for convenience, been illustrated to show two U-joints, 42u and 44u, additional U-joints could also be included. It is also to be realized that for illustrative purposes the operating angles shown are exaggerated. As depicted, segment 42 is attached to segment 40 via U-joint 42u, and segment 40 is attached to segment 44 via U-joint 44u. In some instances, the first shaft segment can be coupled to a vehicle engine/transmission, and the third shaft segment 44 can be coupled to drive wheels of a vehicle, such as through a rear wheel differential. Between the engine/transmission and the drive wheels, the shaft, such as the second shaft segment 40 can be coupled to a frame, vehicle frame, chassis, or utility terrain vehicles or universal task vehicles (UTV) frame or chassis 64 of the vehicle, such as with a carrier bearing 70, to provide support and to carry weight of the shaft or one or more segments of shaft, such as the second shaft segment 40. As used herein, a UTV may comprise utility terrain vehicles, a universal task vehicles, a four-wheel drive vehicle, two-wheel drive vehicle, a sand-rail, dune buggy, all-terrain vehicle (ATV), truck, off-road vehicle, sport utility vehicle, recreational vehicle, defense vehicle, race vehicle, competition type vehicle, or other similar vehicle, whether or not the vehicle is street legal, and whether the vehicle is powered by gasoline combustion engines, pre-detonation or diesel engines, or other engines using propane, natural gas, or any other fuel, as well as vehicles powered by electric motors.

The carrier bearing 70 can be mounted to the frame or chassis 64 of the vehicle using bolts 73, with the second shaft segment 40 of the driveshaft passing through the carrier bearing 70. Applicant has noted that in conventional arrangements, carrier bearings 70 are conventionally formed with the opening or hole through the bearing housing being perpendicular, as a straight 90° angle, to the opposing faces of the carrier bearing housing. However, when the operating angles of the U-joints 42*u* and 44*u* are significantly different or markedly apart, such as with differences of angles, including more that 1 degree of difference, or 2 degrees of difference, and including angles greater than 0 degrees or in a range of 1-15 degrees, the driveshaft will tend to vibrate excessively. In some UTVs, such as the Polaris RZR 1000, both 2-seat (2S) and 4-seat versions (4S), the Polaris Turbo RZR, both the 2S and the 4S version, as well as other UTVs, Applicant has observed that the driveshaft or portions thereof, such as the second shaft segment 40, which is coupled to the carrier bearing 70, will be able to move up or down, in a vertical direction (between the ground and the frame 64 of the vehicle) on the order of 2.5 centimeters (cm) (i.e. about 1 inch (in.)) or more during travel of driving of the vehicle, where the vertical movement is measured as change in vertical position of the second shaft segment 40, such as at ends of the second shaft segment 40 where the U-joints 42*u* and 44*u* are coupled. Such vertical movement or displacement can cause excessive and even extreme vibration, loud noise, and undesired stress and wear to the driveshaft, surrounding components, and performance of the vehicle.

Applicant has noted that the movement and vibration of the second shaft segment 40 occurs as the second shaft segment 40 passes through the bearing 70 at a non-perpendicular angle to the hole or opening through the carrier bearing housing, as well as a non-perpendicular angle to the bearing 71 itself. Although the carrier bearing 70 somewhat constrains movement of the driveshaft, a sizeable gap 72 can exist between the second shaft segment 40 and the bearing 71 of the carrier bearing 70. To reduce stress on the driveshaft (segments 40, 42, 44) and to remedy these problems of vibration, movement or play of the driveshaft 40, and the gap between the second shaft segment 40 and the carrier bearing 70 or bearing 71, a rubber ring is sometimes fitted onto the bearing 70, such as between the housing of the carrier bearing 70 and the bearing 71. The rubber ring for the OEM carrier bearing 70 is toroidal in shape (like a big rubber donut) and is a generic or universal part for conventional driveline. The OEM rubber ring allows the relative operating angle of the drive shaft segment 40 and the carrier bearing 70 to move relative to one another, such as up, down, left, and right, or in any direction in the plane defined by the carrier bearing 70. As such, the OEM rubber ring and the carrier bearing 70 do not address the issues of different rates of rotation, stress, and undesirable vibration, and to the contrary, actually allows for increased movement of the drive shaft, which in turn increases the movement, vibration, and stress, each of which can increase the problems identified by Applicant.

According to, and consistent with, Applicant's new observations and insights, Applicant has created new and improved carrier bearing assembly that is presented herein. The carrier bearing decreases unequal operating angles on universal joints, which in turn can attenuate or reduce differences in rotational speed of driveline components and allow drivelines to spin and or rotate at a same, or nearly a same, speed or angular velocity to reduce unwanted vibration, stress, and driveline failures. By matching or nearly matching operating angles among driveline components, which can in turn dictate rotational mass and spinning speeds, and amount of wear or binding in driveline components or rotational parts can be reduced. By decreasing the compounding operating angles in the driveline, the driveline can operate in a more natural and less irregular way, thereby reducing premature wear on driveline components.

Applicant's carrier bearing will also reduce wear on the rear transmission, including both the output shaft and the internal gears, bearing, and other internal transmission components, by decreasing the operating angle at the point of drive force. The improved carrier bearing allows the universal joints to spin and rotate more freely than with a conventional driveline assembly, and without the binding that causes premature wear, thereby increasing the life of driveline components, including driveline components subject to rotational forces during normal operation. Applicant's fixed relative position and non-perpendicular angle between the carrier bearing and drives shaft, without the excessive shifting permitted and facilitated by OEM rubber O rings, remedies the issues present with the prior art including different rates of rotation for driveline segments based on unequal angles, undesirable vibration, and the resulting stress applied to driveline members and vehicle components.

Figure 3A:
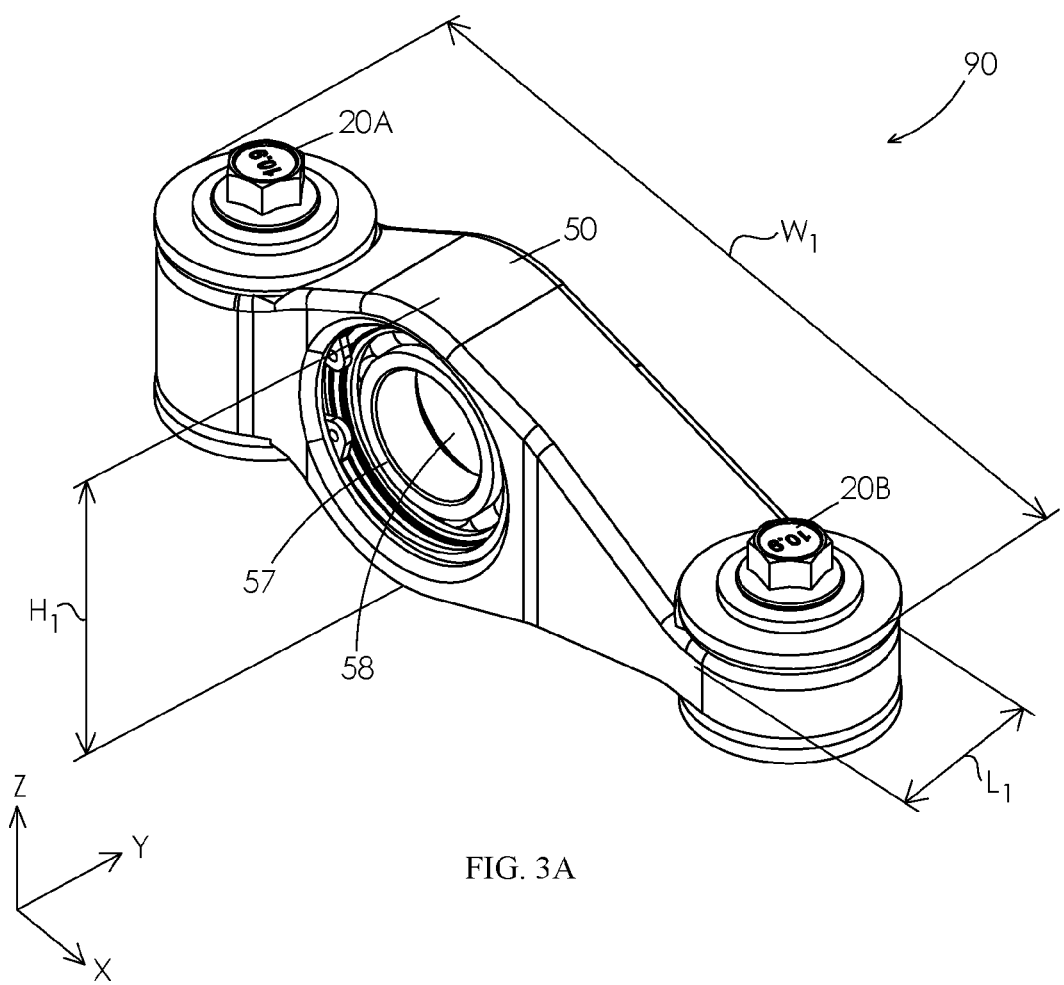
FIGS. 3A-3C illustrate various views of an embodiment of a carrier bearing assembly.

FIG. 3A shows a perspective view of a non-limiting example of carrier bearing assembly 90. The carrier bearing assembly 90 includes a height H that extends in a vertical or z-direction, a width W that extends in a horizontal, lateral, or x-direction such as between left and right sides of the vehicle or in a direction extending between doors of the vehicle, and a length L that is perpendicular to the height and width and extends along a length of the vehicle, such as between the front and back of the vehicle.

The carrier bearing assembly 90 includes a bracket 50 that can be constructed from a strong, durable, and tough material such as metal, including steel, aluminum, aluminum composite, and other suitable materials. The bracket 50 can be formed of one or more pieces, and in some instance can be formed of a single, unitary, or modular pieces. The bracket 50 can be cast, formed, carved, machined, or formed in any other suitable way. The bracket 50 can be formed of a single material or multiple materials, including alloys, and with a desired finish, plating, or treatment. The bracket 50 can be coupled, attached, or bolted to the frame 64 of a vehicle or UTV, such as the Polaris RZR 1000, using fastener members 19A and 19B, which can comprise bolts 20 and bolt holes 21 as well as washers 23, bushing pairs 24/25, and bushings 26 as shown in FIG. 3A. When replacing an original carrier bearing assembly, the bolts 20A and 20B can screw into the original carrier bearing mounting holes so that the position of the original carrier bearing and the new carrier bearing 90 is same with respect to the frame 64 of the vehicle and the driveshaft of the vehicle. As shown, the carrier bearing assembly 90 can include a bearing 57, and a driveshaft opening or hole 58 in the bearing 57, through which the driveshaft of the vehicle can pass through. The original equipment manufacturer (OEM) carrier bearings, such as carrier bearing 70, are generally symmetrical about the bearing, so that the opening for receiving the drive shaft is at the center of the carrier bearing, the center of the bracket, the center between the two bolt holes in the OEM carrier bearing 70 (e.g. equidistantly spaced between the two bolt holes), or the center of the bolt holes in the frame 64.

The centered bearing opening in the OEM bearing 70 can increase the operating angle of the drive shaft with respect to the bearing 70, due to the alignment between a rear transmission and a front differential or gear case of the UTV. The increased operating angle of the drive shaft and the bearing 70 can also increase or magnify the driveline vibration issue. On the other hand, the opening 58 and the bearing 57, as well as the opening 55 in the bracket 50, can be offset, or laterally offset in an x-direction or along a width of the bracket 50, so that the center of the opening 58 is offset from a center of the bracket 50. Stated another way, when the bolds 20A and 20B are offset an equal or same distance from opposing ends of the bracket 50, the center C of the circular openings 55, 58 can be closer to one bolt than the other, such as closer to the bolt 20A than the bolt 20B.

Figure 3B:
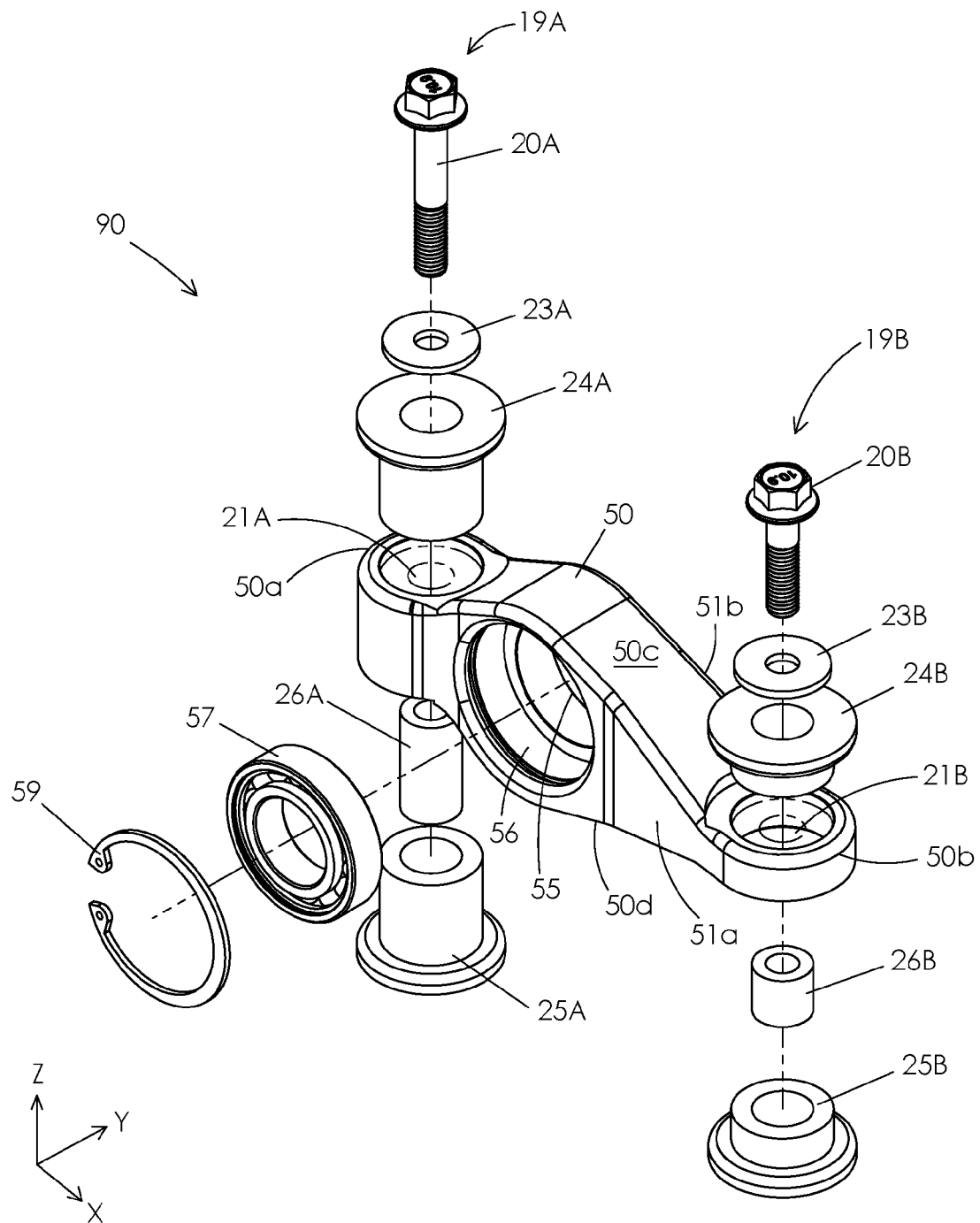

The fastener members or the mounting structures 19 can be used to couple, secure, or bolt the carrier bearing assembly 90 to the frame 64 and can comprise any desirable mechanical or chemical fasteners including nuts and bolts, rods, pegs, clamps, welding, rivets, pins, screws, adhesives, or other suitable devices, such as bolts 20A 20B, which can be at least one bolt or at least two bolts. In some instances, two bolts 20A 20B can be used, and the bolts can extend through the bracket 50 from a top side 50c to a bottom side 50d of the bracket 50 (or in some instances from the bottom side to the top side) so as to attach the bracket 50 to corresponding mounting holes 66A, 66B in the frame 64. In other instances, instead of mounting holes 66A 66B in the frame 64, the frame 64 can comprise one or more bolts, threaded portions, or other structure that extend from the frame 64 into the bolt holes 21A, 21B in the bracket 50. In yet other instances, instead of bolt holes 21A, 21B being formed, or extending into the bracket 50, one or more bolts, threaded portions, or other structure can be integrally formed or permanently attached to the body 50 without using bolt holes 21A, 21B, or without having bolt holes 21A, 21B formed in the body 50, so that the bolts, threaded portions, or other structures extend from the body 50 and can be coupled to the holes 66A and 66B in the frame 60. In some instances, the bolts 20A, 20B may be attached to the mounting holes 66A, 66B used by the OEM carrier bearing 70, as shown in FIG. 3B, thereby eliminating additional time and expense that could be incurred with the use of other arrangements or fastener members 19, as described above. The bracket 50 can be mounted to the vehicle chassis 64 in a method that allows a small amount of compliance at each fastening location (both bolts 20A 20B) to account for manufacturing variation in the OEM vehicle frame 64, or different vehicle frames.

FIG. 3B shows a non-limiting example of an exploded view of the carrier bearing assembly 90, similar to the view of the carrier bearing 90 shown in FIG. 3A. The mounting structure used to mount the carrier bearing assembly 90 onto the vehicle frame 64 may comprise two bolts, bolts 20A, 20B and corresponding stepped bushing pairs 24A/25A and 24B/25B, respectively. The bolts 20A, 20B may be disposed in bolt holes 21A, 21B, each of the bolts being offset the same, or about the same, distance from respective first end edge 50a, and second end edge 50b, of a top side 50c and a bottom side 50d of the bracket 50. The bolts 20A and 20B can be grade 10.9, for example. Additionally bushings 26A, 26B and washers 23A, 23B can be employed. The stepped bushings 24A/B and 25A/B may provide additional compliance between the bracket 50 and the vehicle frame 64 to account for manufacture variation and vibration. The stepped bushings 24A/B and 25A/B may be constructed of vibration absorbing material such as rubber. In the illustrated embodiment, the bolt 20A and corresponding bushings are longer than the bolt 20B and corresponding bushings. However, it is to be understood that the lengths of the mounting components may vary depending on the vehicle to which the bracket 50 will be mounted, as well as other design choices. Additionally, it is to be noted that the bushings 25A/26A and 25B/26B can also be used to raise the bracket a predetermined distance from the original position of the OEM carrier bearing assembly.

FIG. 3B also shows the bearing 57 which can be friction fit into bracket opening 55, and additionally retained using a retaining ring 59 or the like. The bearing 57 can also contain friction-reducing elements, such as ball or roller bearings. Vibration-damping elements such as a rubber ring adjacent the bearing 57 can be incorporated into the design, if desired.

Figure 3C:
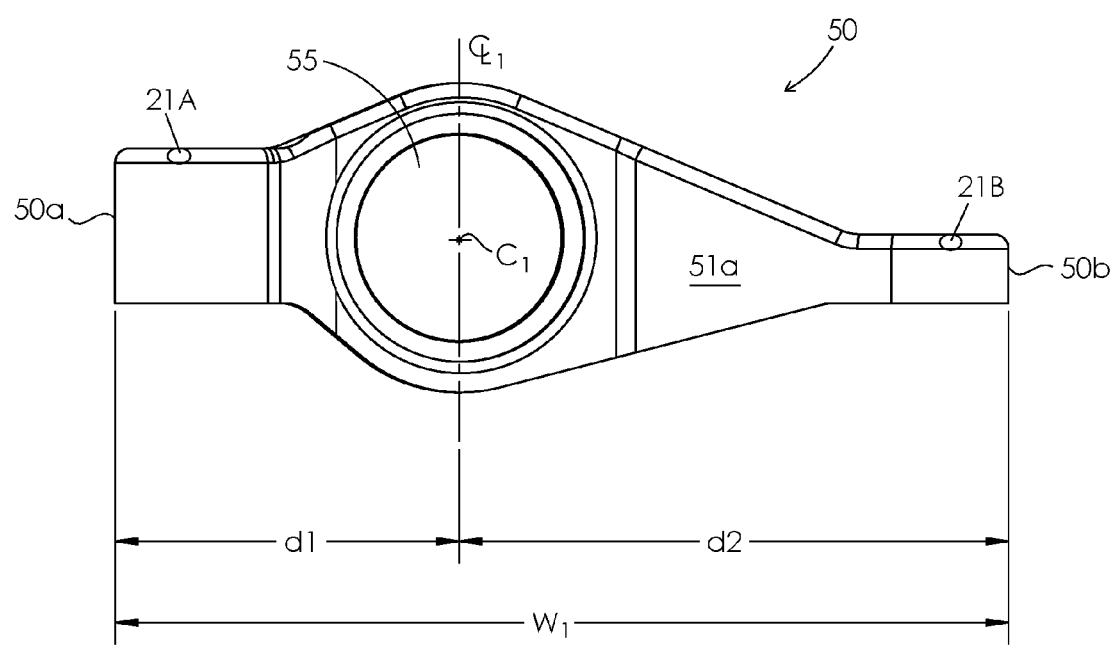
Figure 3C:
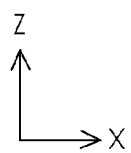

FIG. 3C shows a profile view of the front or rear of the bracket 50 or the carrier bearing assembly 90 as shown in the x-z plane. The bracket 50, or the opening 58 and bearing 71 within the bracket 50, may be substantially offset (e.g., offset by more than 2.5 cm, 2 cm, or 1.5 cm (e.g., 1 in., ¾ in., or ½ in.)) from the lateral midpoint, or to the first side 50a, which is shown to the left in FIG. 3C. In the illustrated example, the distance from center line CL of the opening 55 to the first or left edge 50a is d1 and the distance from the CL of the opening 55 to the second or right edge 50b is d2, where d1<d2. In this case, the distance d1 is at least 3 cm, 2.5 cm, 2 cm, or 1.5 cm (1 in., ¾ in., or ½ in.) less than d2, such that the driveshaft of the vehicle will be urged leftward or toward the first or left end 50a by a corresponding, and significant or substantial distance. Additionally, the opening 55 need not be a 90° straight hole (as in the case of prior art designs) that is perpendicular to a first or front face 51a. The opening also need not be perpendicular to the second or rear face 51b of the bracket 50, the front face 51a and the rear face 51b being parallel or substantially parallel, such as within less than or equal to 5°. In an embodiment, the opening 55 can be formed by drilling, pressing, broaching, casting, molding, cutting, punching, machining, or other suitable process or method, and extend through the bracket 50 at an angle a such that that 90°<x<95° or 85°<x<90°. In other embodiments, the opening 55 can be formed as a straight 90° hole (i.e., where angle x is about 90°. In still other embodiments, the angle x can be any suitable angle. Additional detail regarding the angle x is presented with respect to FIGS. 7a and 7b. While the opening 55 is shown being offset in a leftward direction relative to the centerline CL of the carrier bracket 50, it is to be understood that the opening 55 could instead be offset in a rightward direction. Furthermore, while the opening 55 is shown as a non-straight hole, it is to be understood that the opening 55 could be formed as a straight hole while the bearing 57 (FIG. 3B) is constructed such that the driveshaft hole 58 (FIG. 3A) of the bearing 57 is formed as a non-straight hole at the angles x described herein.

Accordingly, the carrier bearing assembly 90 can comprise a bracket 50, a mounting structure permitting the bracket 50 to be mounted to a frame 64 of a vehicle, and an opening 55 in the bracket 50 extending through the bracket 50, from a first face 51a of the bracket 50 to a second face 51b of the bracket 50, the opening 55 being substantially offset (e.g., an 2.54 cm, or 1 in. or more) in a direction away from a center of the bracket 50. A bearing 57 can be fitted into the opening 55 permitting a driveshaft or drive shaft segment 60 of a vehicle like a UTV, and similar to shaft 40 shown in FIG. 2, to pass through the opening 55 so that the carrier bearing assembly 90 can substantially constrain movement of the driveshaft 60. A non-limiting example of the drive shaft 60 is shown in FIG. 8. Additionally, the opening 55 in the bracket 50 can be formed as a non-straight hole (e.g., not perpendicular, but acute or obtuse to the first or second faces 51a, 51b) allowing the driveshaft 60 to pass through the bearing 57 at a non-perpendicular angle as measured with respect to the bracket 50. In general, the opening 55 can be formed at any angle suitable for reducing vibration and stress on the driveshaft 60, as discussed in greater detail with respect to FIGS. 7A and 7B. The bearing 57 can also contain friction-reducing elements, such as ball or roller bearings. A gap G between the driveshaft 60 and the bearing 57 can be less than about 0.254 mm (0.01 in.) at all times the bearing 57 is coupled to the bracket 50 and the driveshaft 50, including during operation and driving of the vehicle or UTV to which the bracket 50 and driveshaft 60 are attached. The carrier bearing assembly 90 can be constructed of one or more of steel, aluminum, or aluminum composite material, and can further include vibration-damping elements such as a rubber ring, if desired. The carrier bearing assembly 90 permits a substantial correction to at least one operating angle of the driveshaft 60 by constraining the angle of a portion of the driveshaft 60, and is particularly well suited for on/off-road vehicles including UTVs.

The mounting structure can include bolts 20A, 20B and bolt holes 21A, 21B for bolting the bracket securely to the frame 64 of the vehicle, the at least two bolts 20A, 20B extending through the bracket 50 from the top side 50c of the bracket 50 to the bottom side 50d of the bracket 50 so as to attach the bracket 50 to corresponding mounting holes 66A, 66B in the frame 64, which are shown, e.g., in FIG. 8. The bolts 20A, 20B can be advantageously attached to the mounting holes used by the OEM carrier bearing, such as a conventional carrier bearing 70. The bracket 50 can be mounted to the vehicle chassis 64 in a method that allows a small amount of compliance at each fastening location (bolts 20A, 20B) to account for manufacturing variation among the OEM vehicle frames 64. In an embodiment, stepped bushings 24A/25A and 24B/25B may be used for this purpose.

According to other aspects, a method of adjusting operating angles of a driveshaft 40, 60 in a UTV can comprise (1) removing a first carrier bearing assembly 70 from a driveshaft 40, 60 of a vehicle, the driveshaft 40, 60 having a first set of operating angles; and (2) mounting a second carrier bearing assembly 90 onto the driveshaft, 40, 60 using the same mounting holes 66A, 66B used to secure the first carrier bearing 70, the second carrier bearing assembly 90 permitting the driveshaft 40, 60 to assume a second set of operating angles, the second set of operating angles substantially different from the first set of operating angles. The first carrier assembly 70 can be an OEM or equivalent carrier bearing assembly and the second carrier bearing assembly 90 on of the novel carrier bearing assemblies described and shown in FIG. 8.

Figure 4A:
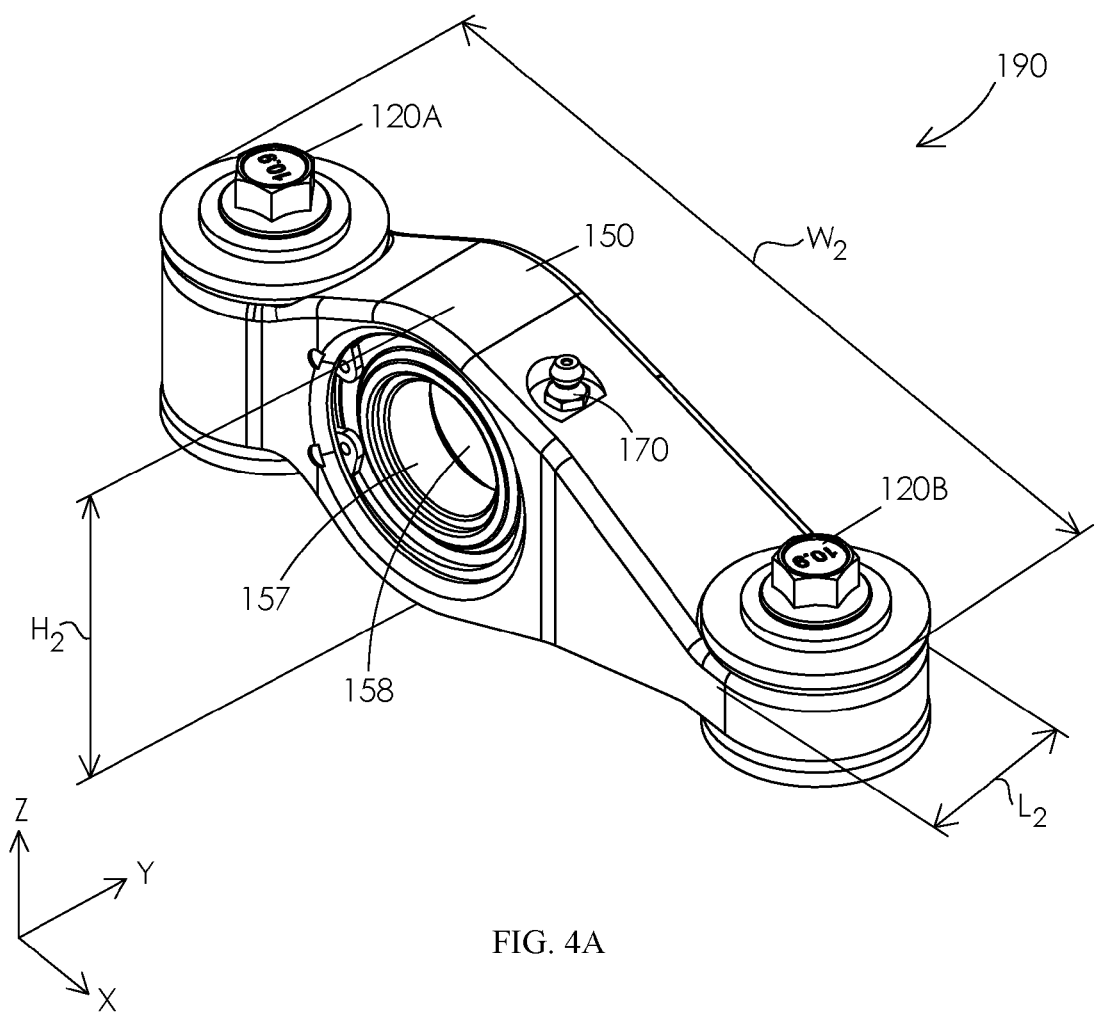
FIGS. 4A-4D illustrate various views of another embodiment of a carrier bearing assembly.

FIGS. 4A-4D illustrate various views of another embodiment of a carrier bearing assembly 190, similar to the carrier bearing assembly 90 shown and described in FIGS. 3A-3C, where like parts are similar or identical, and the description given above is applicable here. More specifically, FIG. 4A shows a perspective view of the carrier bearing assembly 190 comprising the additional feature of a zerk, grease fitting, or grease nipple 170 for feeding lubricants, such as grease into the bearing 175, using, e.g., a grease gun.

Figure 4B:
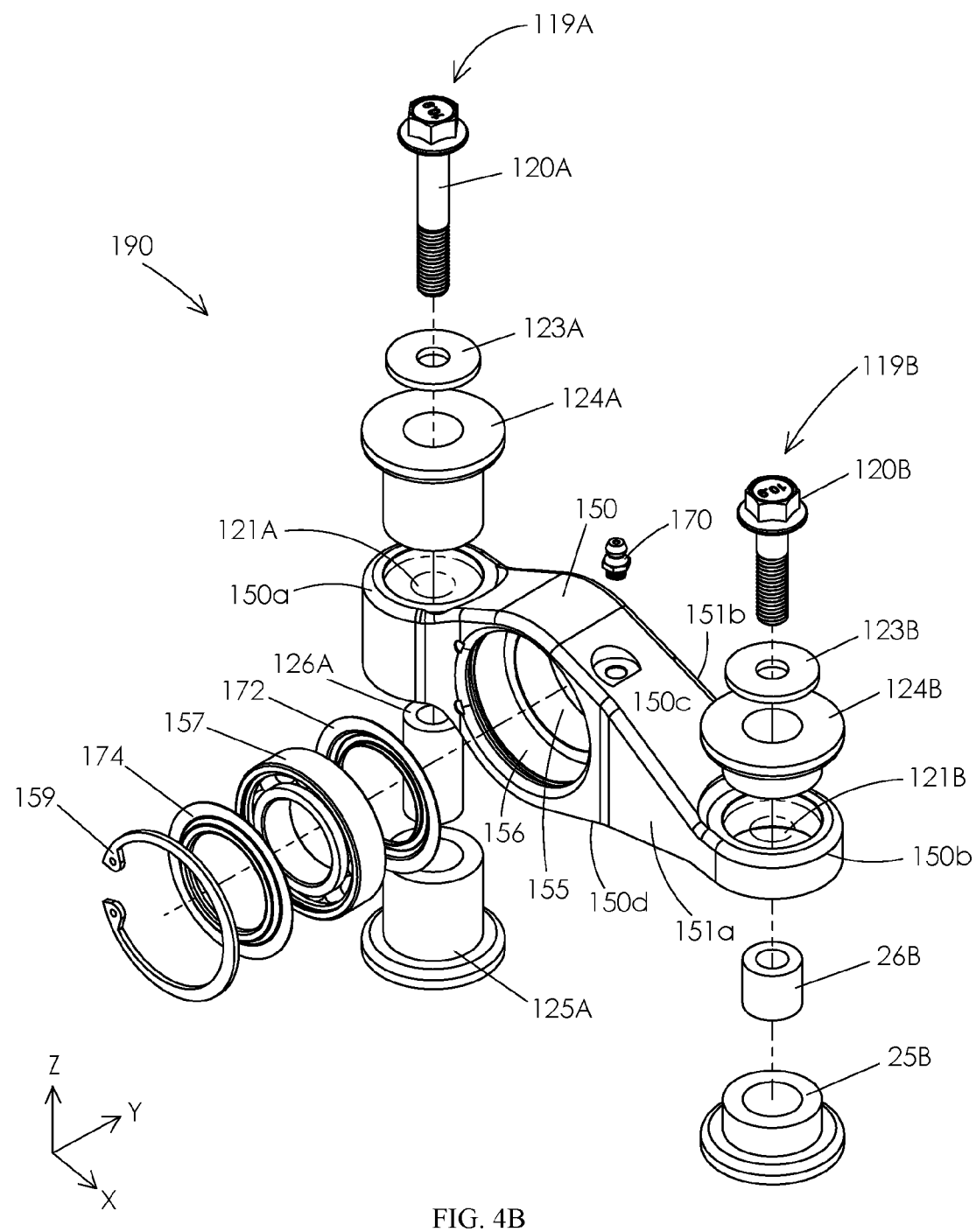

FIG. 4B shows a non-limiting example of an exploded view of the carrier bearing assembly 190, similar to the view of the carrier bearing 190 shown in FIG. 3A. FIG. 4B additionally include bearing shields 172 and 174 that can be disposed against or adjacent opposite sides of bearing 157 when the bearing and the bearing shields 172, 174 are disposed within the opening 155 in the bracket 150. The bearing shields 172, 174 can be made of metal, rubber, or other suitable material, and can keep trash, foreign debris, and undesired materials from contacting, contaminating, or harming the bearing 157. The bearing shields 172, 174 can also keep or maintain a lubricant or grease within or adjacent the bearing 57, thereby providing additional protection to the bearing 57 from outside contamination. The additional protection can extend to off road conditions, including driving into water, muddy conditions, or other high contamination environments, where additional lubricant can provide protection beyond what would be provided by conventional or sealed OEM carrier bearings 70. While the conventional sealed bearings can be desirable for street use, Applicant has discovered the added benefit from the additional protections from bearing shields 172, 174 and the additional lubricant that can reduce or prevent failure resulting from inadequate protection for the bearing.

Figure 4C:
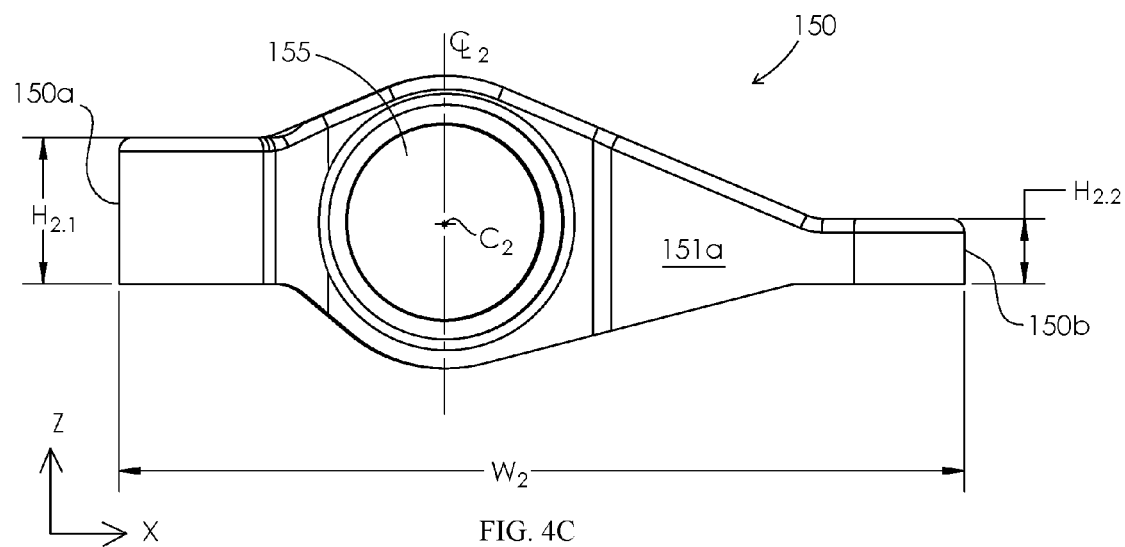

FIG. 4C shows a profile view of the front 151a of the bracket 150 or the carrier bearing assembly 190 as shown in the x-z plane. The first end of the bracket 150a can comprise a height $H_{2.1}$ that is about 3.4 cm (1.35 in.) where "about" (for this instance and other instances herein) comprises a percent difference less than or equal to 20%, 10%, 5%, or 1%. The second end of the bracket 150b can comprise a height $H_{2.2}$ that is about 1.5 cm (0.6 in.).

Figure 4D:
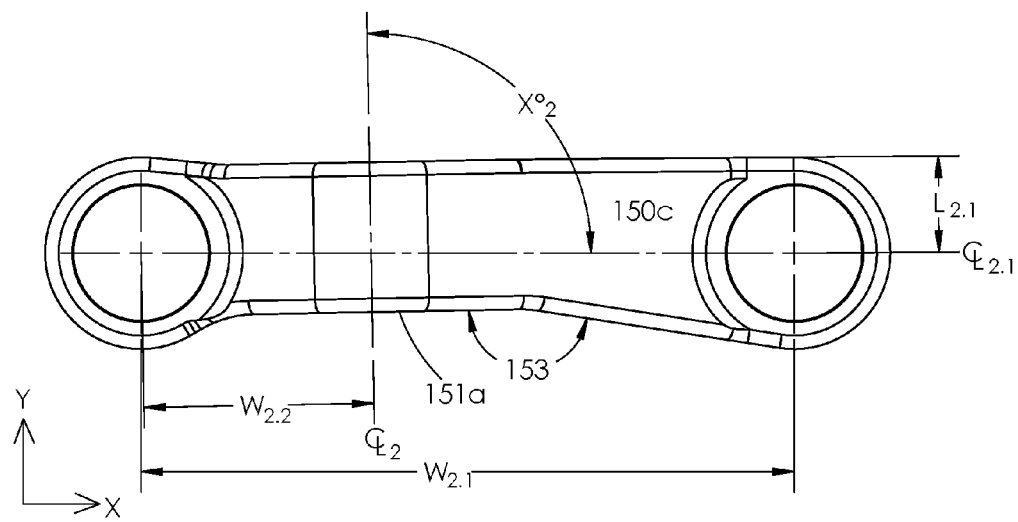

FIG. 4D shows a plan view of the top 150c of the bracket 150 of the carrier bearing assembly 190 as shown in the x-z plane. FIG. 4D shows the centerline $CL_2$ of the opening 155 that passes through the center $C_2$ of the opening 155. FIG. 4D also shows the centerline $CL_{2.1}$ that passes through the center of the bolt holes or openings 121A, 121B, the centerline $CL_{2.1}$ intersecting with the centerline $CL_2$ at a non-perpendicular angle $x_2°$, such as an angle $x_2°$ greater than 90°, in range of 90.1-98°, in range of 90.1-95°, or about 91.5°. Thus, the angle $x_2°$, like the angle $x°$ shown in FIG. 3C, can accommodate the shaft 60, while reducing gaps, vibration, wear, and other undesirable features or results. FIG. 4D also shows a width $W_{2.1}$ between the center of the openings 121A and 121B that can comprise a distance of about 15 cm or 15.367 cm (about 6 in., or 6.05 in.). A width $W_{2.2}$ that extends between the center $C_2$ of the openings 121A and the centerline $CL_2$ can comprise a distance of about 5 cm or 5.38 cm (about 2 in., or 2.12 in.). A first face 151a of the bracket 150 comprises a bend 153 comprising an angle greater than 1°, the bend 153 being offset from the opening 155.

Figure 5A:
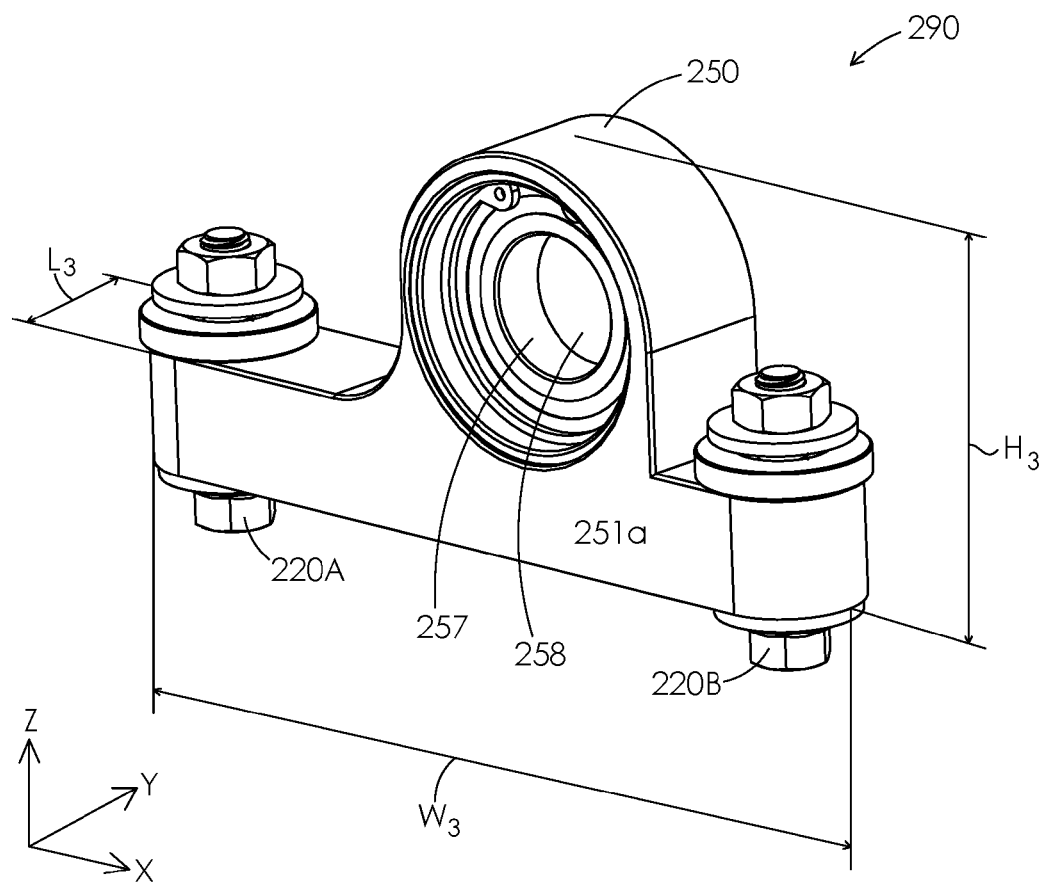
FIGS. 5A-5D illustrate various views of another embodiment of a carrier bearing assembly.

FIGS. 5A-5D illustrate various views of another embodiment of a carrier bearing assembly 290, similar to the carrier bearing assembly 90, 190 shown and described in FIGS. 3A-3C and FIGS. 4A-4D, respectively, where like parts are similar or identical, FIGS. 4A-4D illustrate various views of another embodiment of a carrier bearing assembly 190, similar to the carrier bearing assembly 90 shown and described in FIGS. 3A-3C, where like parts are similar or identical, and the description given above is applicable here. More specifically, FIG. 5A shows a perspective view of the carrier bearing assembly 290 comprising different shaped bracket 250, that can be mounted above or on top of the frame 64 rather than below or under the bottom of the frame 64. While the shape and general form instead of having a sloped or tapered sides between the opening 255 and the ends 250a, 250, like the sloped or tapered sides of carrier bearing assemblies 50, 150, the bracket 250 can more closely follow the contour of the opening 155 along the top 250c of the bracket 250 forming an arced or circular shape, while the bottom surface 250d and the top surface 250c away from the opening 255 can be flat or planar and not sloped. FIGS. 5A-5D also show that nuts 227A, 227B can be coupled to bolts 220A and 220B to facilitate the tightening or coupling of the carrier bearing assembly 290 to the frame 64. A height $H_3$ of the bracket 250 can comprise 8.59 cm (3.38 in.), or about the same. A height from the bottom 250d of bracket 250 to the center C3 of the opening or hole 258 can be 5.08 cm (2.00 in.), or about the same. A width $W_3$ of the bracket 250 can comprise 18.36 cm (7.23 in.), or about the same. A distance along the width $W_3$ from the centers of the bolt holes 221A, 221B can be 15.20 cm (5.984 in.), or about the same. A length $L_3$ of the bracket 250 can comprise 3.18 cm (1.25 in.), or about the same. As used herein, the same can mean within a percent difference less than or equal to 30%, 20%, 10%, 5%, 2%, or 1%.

Figure 5B:
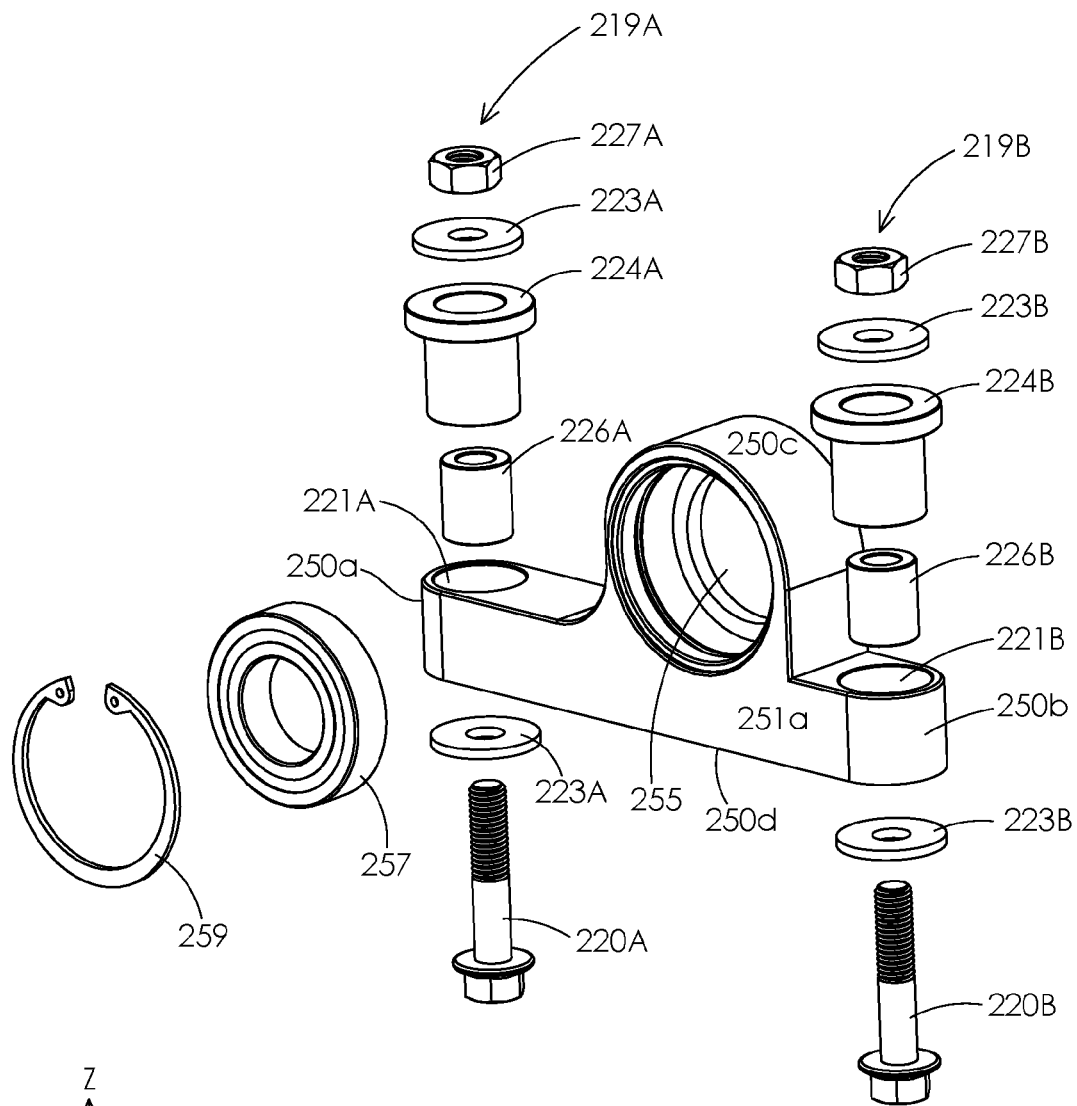
Figure 5C:
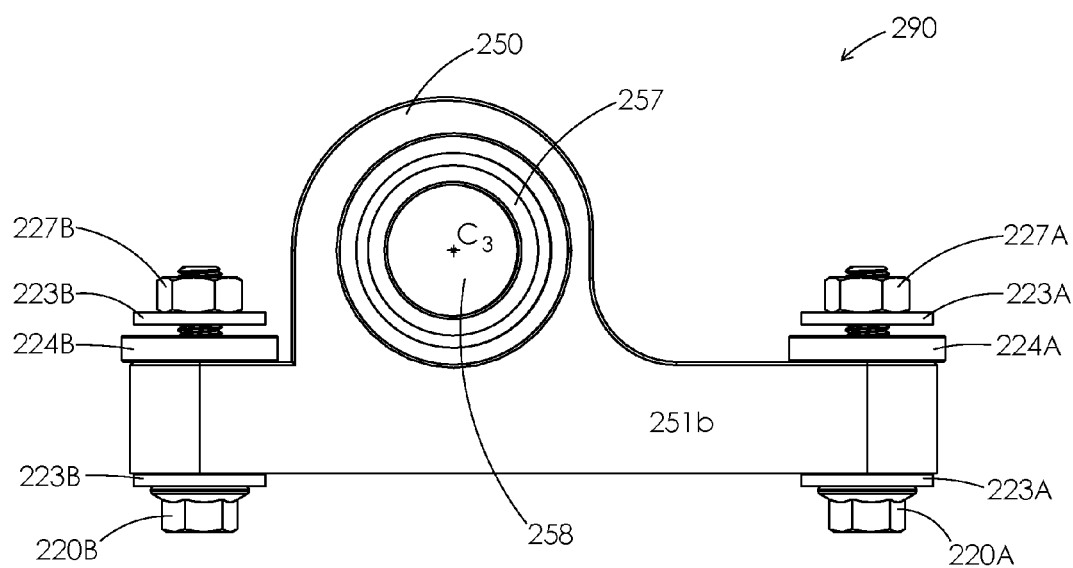
Figure 5D:
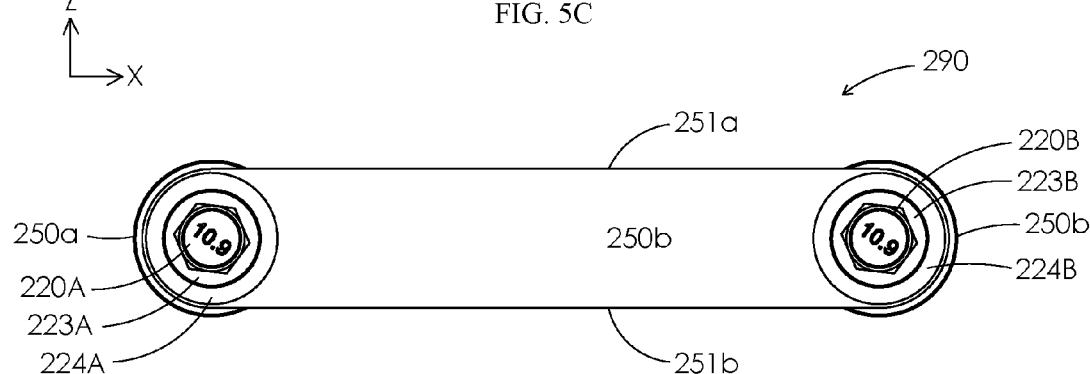

FIG. 5B shows a non-limiting example of an exploded view of the carrier bearing assembly 290, similar to the view shown in FIG. 5A, and similar to the views of carrier bearings 90, 190 shown in FIGS. 3B and 4B, respectively. FIG. 5B shows bushings 224A and 224B that can be used in isolation, as shown, or together with other bushings as part of a bushing pair. The busing pairs can be similar or identical to what is shown in FIGS. 3B and 4B with bushing pairs 24A/25A and 24B/25B, as well as 124A/125A and 124B/125B, respectively. FIG. 5C shows a profile view of the rear 251b of the bracket 250 or the carrier bearing assembly 290 as shown in the x-z plane. FIG. 5D shows a plan view of the bottom 250c of the carrier bearing assembly 290 as shown in the x-y plane.

FIGS. 6A-6D illustrate various views of another embodiment of a carrier bearing assembly 390, similar to the carrier bearing assembly 290 shown and described in FIGS. 5A-5D, where like parts are similar or identical, FIGS. 4A-4D illustrate various views of another embodiment of a carrier bearing assembly 190, similar to the carrier bearing assembly 90 shown and described in FIGS. 3A-3C, where like parts are similar or identical, and the description given above is applicable here. More specifically, FIGS. 6A-6D differ from FIGS. 5A-5D in that instead of a single integrally formed or unitary bracket 350, such as brackets 50, 150, and 250, the carrier bearing assembly 390 comprises a first or upper integrally formed or machined bracket component 350A and a second or lower integrally formed or machined bracket component 350B. The upper bracket component 350A and the lower bracket component 350B can be coupled together with any suitable attachment device or method including welding, adhesive, or mechanical fasteners, including threaded bolts 352 received, or passing through, openings 353, wherein opening 353 can pass completely though the lower bracket component 350B and partially but not completely through the upper bracket component 350A. An additional differences between FIGS. 6A-6D and FIGS. 5A-5D include the additional of a zerk, grease fitting, or grease nipple 370 for feeding lubricants, such as grease into the bearing 357, using, e.g., a grease gun.

Figure 6A:
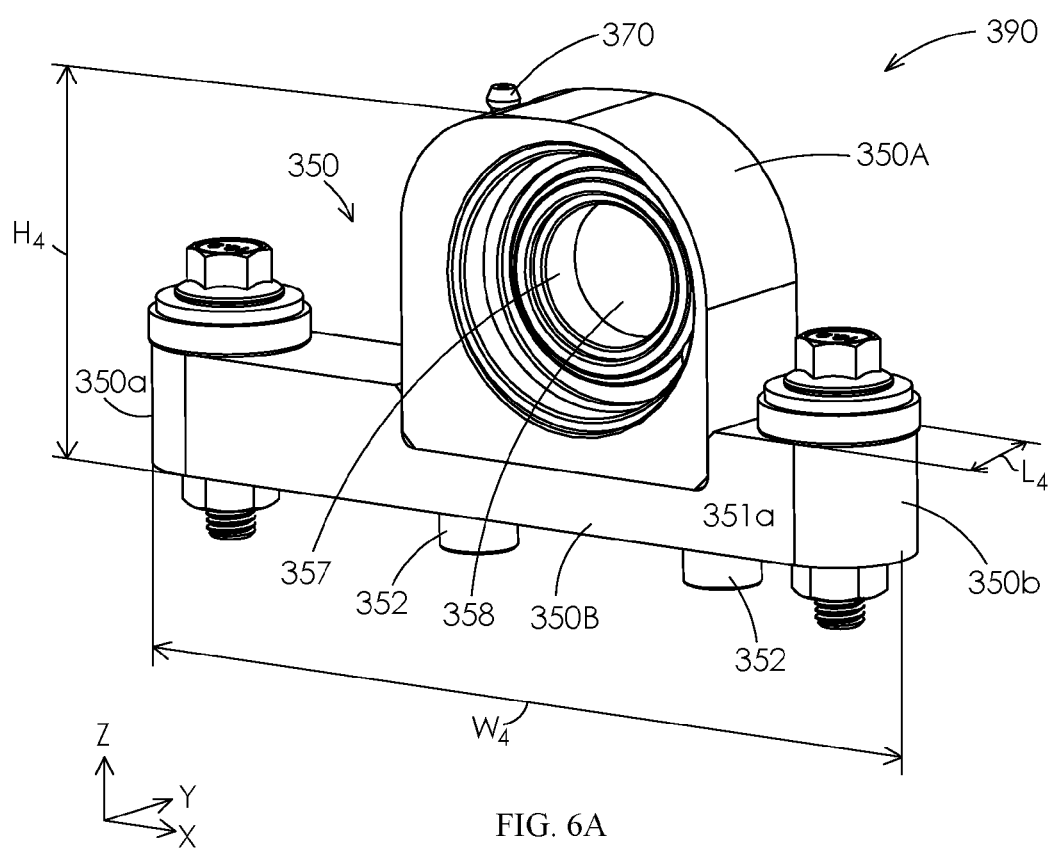
FIGS. 6A-6E illustrate various views of another embodiment of a carrier bearing assembly.
Figure 6B:
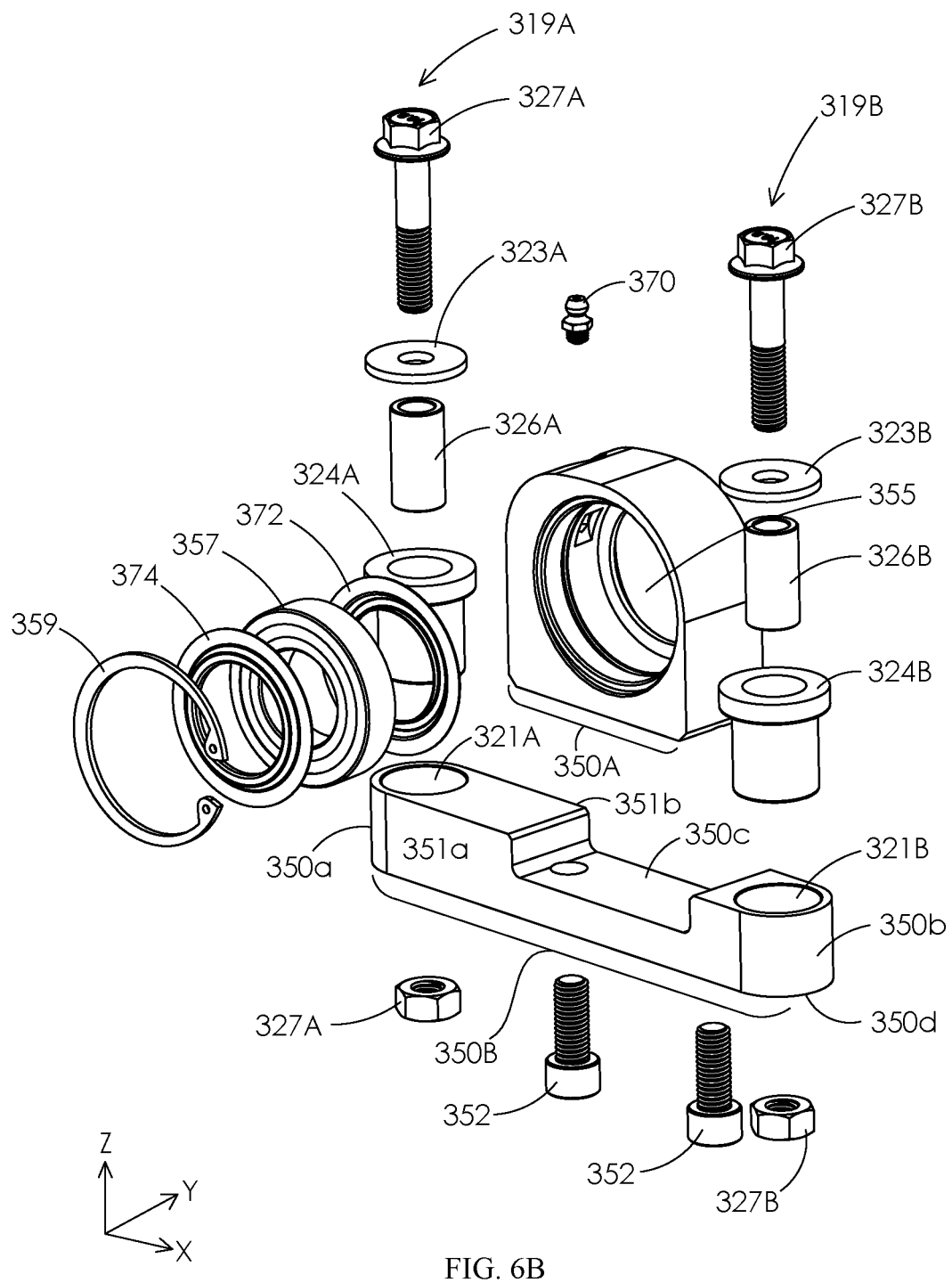

FIG. 6A shows a perspective view of the carrier bearing assembly 390, with the front face 351a oriented toward the viewer, and with the upper bracket component 350A rigidly coupled to the lower bracket component 350B with mechanical fasteners or threaded bolts 352. A height $H_4$ of the bracket 350 can comprise 8.59 cm (3.38 in.), or about the same. A width $W_4$ of the bracket 350 can comprise about 18 cm or 18.4 cm (about 7 in. or 7.23 in.), while a width $W_{4.1}$ from the centers of the bolt holes 321A, 321B can be 15.20 cm (5.984 in.), or about the same. A length $L_4$ of the bracket 350 can comprise 3.18 cm (1.25 in.) or about the same. FIG. 6B shows a non-limiting example of an exploded view of the carrier bearing assembly 390, similar to the view of the carrier bearing 390 shown in FIG. 6A. FIG. 6B additionally include bearing shields 372 and 374 that can be disposed against or adjacent opposite sides of bearing 357 when the bearing and the bearing shields 372, 374 are disposed within the opening 355 in the bracket 350. The bearing shields 372, 374 can be made of metal, rubber, or other suitable material, and can keep trash, foreign debris, and undesired materials from contacting, contaminating, or harming the bearing 357, as described above with respect to bearing shields 172, 174.

Figure 6C:
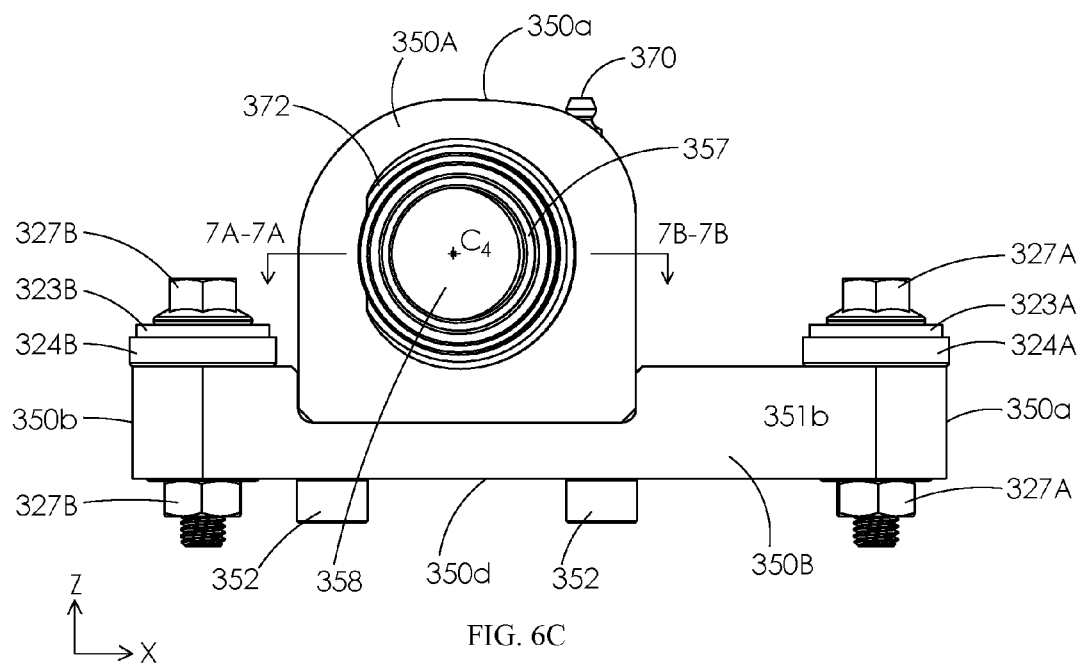
Figure 6D:
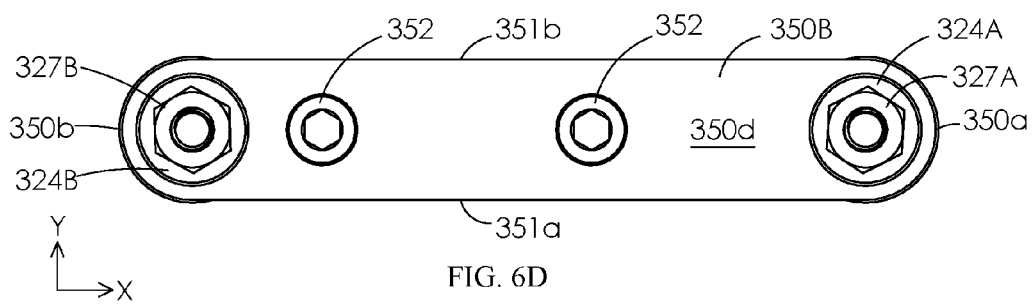

FIG. 6C shows a profile view of the front 351a of the bracket 350 or the carrier bearing assembly 390 as shown in the x-z plane. FIG. 6D shows a plan view of the bottom 350c of the carrier bearing assembly 390 as shown in the x-y plane, with the nuts 327A, 327B and the threaded bolts 352.

Figure 6E:
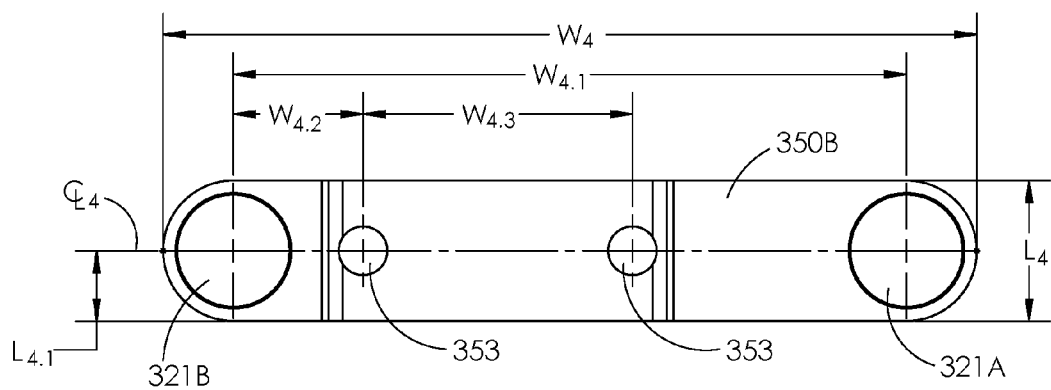

FIG. 6E shows the centerline $CL_4$ that may pass through the centers of one or more of the openings 321A, 321B, and the openings 353. A distance $L_{4.1}$ from the centerline $CL_4$ to a front or rear face 351a, 351b can comprise a distance of about 1.6 cm or 1.5875 cm (about 0.6 in., or 0.625 in.). FIG. 6E also shows the width $W_4$ as well as additional widths, such as the width $W_{4.1}$ between the center of the openings 321A and 321B that can comprise a distance of about 15 cm or 15.367 cm (about 6 in., or 6.05 in.). A width $W_{4.2}$ that extends between the center of the openings 321B and the center of a first opening 353 can comprise a distance of about 3 cm or 2.9 cm (about 1 in., or 1.15 in.). A width $W_{4.3}$ that extends between the centers of first and second openings 353 can comprise a distance of about 6 cm or 6.08 cm (about 2.4 in., or 2.395 in.).

Figure 7A:
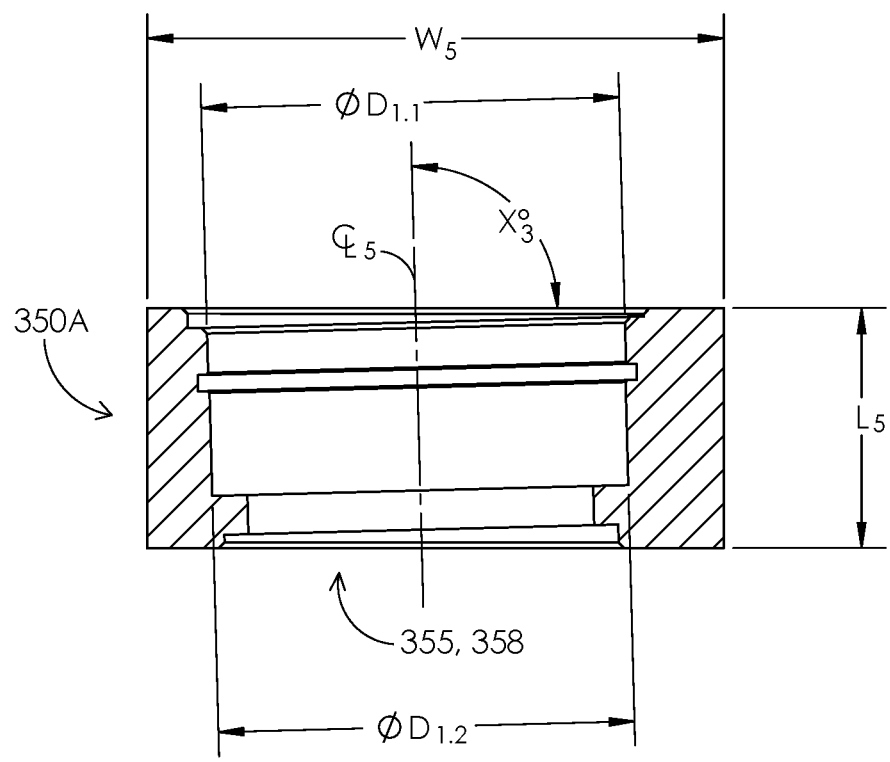
FIGS. 7A and 7B illustrate exemplary cross-sectional views of embodiments of carrier bearing assemblies.
Figure 7B:
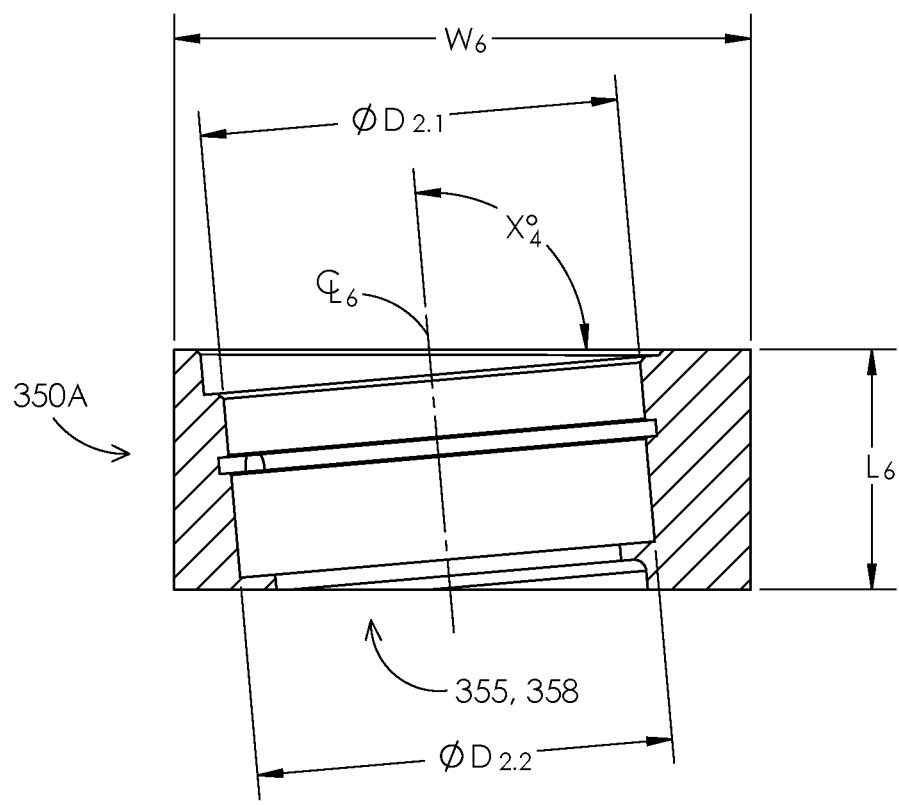

FIGS. 7A and 7B provide additional detail of cross-sectional views of the first bracket component 350A, as shown taken along the section line 7A-7A and 7B-7B, respectively, shown in FIG. 6C. FIG. 7A shows the centerline $CL_5$ of the opening 355, 358 that passes through the center, and along a length $L_5$ of the openings 355, 358, where the length $L_5$ can comprise a distance of about 3 cm or 3.175 cm (1.25 in.). A width $W_5$ of the first bracket component 350A can comprise a distance of about 7.62 cm (3 in.). A diameter $D_{1.1}$ of the opening 355 in bracket 350, or opening 358 in bearing 358 can comprise a distance of about 5.5 cm or 5.525 cm (about 2.2 in., or 2.175 in.). A diameter $D_{1.2}$ of the openings 355, 358 can comprise a distance of about 5.5 cm or 5.477 cm (about 2.2 in., or 2.1564 in.). An angle $x_3°$ can be about 91.5°, which can be beneficial for a 2-seater RZR 1000, wherein the angle $x_3$ can be measured between the opening 355, 358 and the bracket 350 with respect to the first face 351a or second face 351b of the bracket 350, or between the opening 355, 358 and the bracket 250, as measured with respect to a centerline $CL_5$ of the bracket 350.

FIG. 7B shows the centerline $CL_6$ of the opening 355, 358 that passes through the center, and along a length $L_5$ of the openings 355, 358, where the length $L_6$ can comprise a distance of about 3 cm or 3.175 cm (1.25 in.). A width $W_6$ of the first bracket component 350A can comprise a distance of about 7.62 cm (3 in.). A diameter $D_{2.1}$ of the openings 355, 358 can comprise a distance of about 5.5 cm or 5.525 cm (about 2.2 in., or 2.175 in.). A diameter $D_{2.2}$ of the openings 355, 358 can comprise a distance of about 5.5 cm or 5.477 cm (about 2.2 in., or 2.1564 in.). An angle $x_4°$ can be about 91.5°, which can be beneficial for a 4-seater RZR 1000, wherein the angle $x_4$ can be measured between the opening 355, 358 and the bracket 350 with respect to the first face 351a or second face 351b of the bracket 350, or between the opening 355, 358 and the bracket 250, as measured with respect to a centerline $CL_6$ of the bracket 350.

FIGS. 8A-8E illustrate various views of another embodiment of a carrier bearing assembly 490, similar to the carrier bearing assembly 390 shown and described in FIGS. 6A-6E, and carrier bearing assemblies 90, 190, and 290, where like elements or parts similarly numbered are similar or identical. More specifically, the carrier bearing assembly 490 differs from the carrier bearing assemblies 90, 190, 290, and 390 by comprising an auto set angle between the bearing 457 and the bracket 450, or between the upper bracket 450A and the lower bracket 450C, similar to angles x3 and x4 shown in FIGS. 7A and 7B, respectively. Additional explanation of the auto set angle is described below with respect to FIGS. 8F-8H.

An additional and advantageous feature of the carrier-bearing 490 is that the zerk, grease fitting, or grease nipple 470 for feeding lubricants, such as grease into the bearing 457, using, e.g., a grease gun can allow the bearing 457 to be greased while in use, such that the bearing need not be removed or disassembled to be greased. Additional explanation of how the carrier bearing assembly can be greased while in use, is described below with respect to FIGS. 9A-9G.

Greasing and operation of the bearing 457 within the carrier bearing assembly 490 can be facilitated by bearing shields or seals 472, 473, and 474 that can be either a custom bearing shield or seal 473 or a stock or off the shelf shield or seal 472, depending on the particular bearing 457, drive line 60, and other relevant components or considerations. In any event, the carrier bearing 490, or features thereof together with other of the carrier bearings 90, 190, 290, or 390 can be used with any of the UTVs described herein, including both 2 seat and 4 seat RZRs such as RZR 1000 Turbos, to improve performance and operation for the UTV. Additional detail of the structure of the greasable bearing 457 and the shield 472 are shown away from the carrier bearing assembly 490 in FIGS. 9A-9G.

Figure 8A:
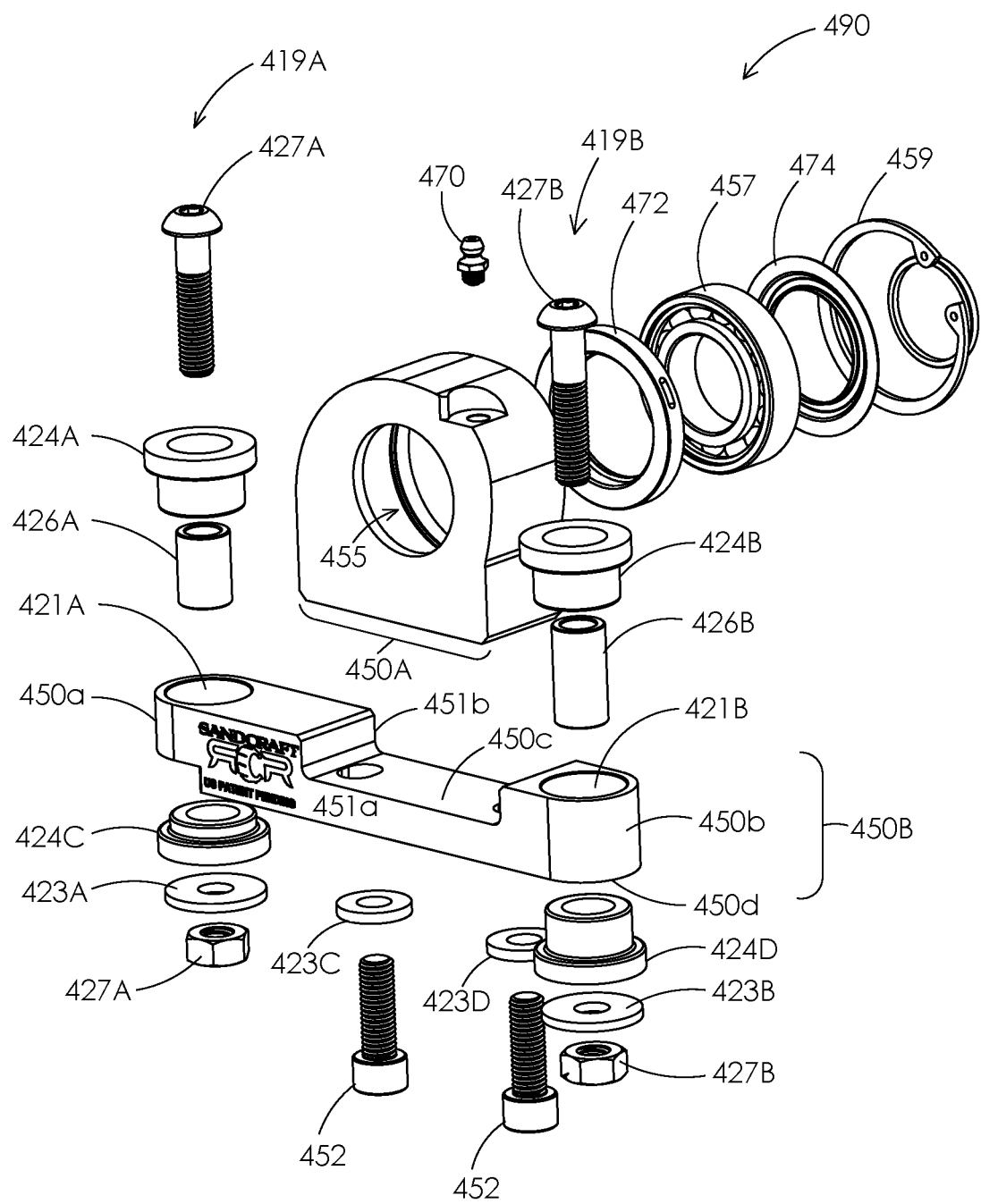

FIG. 8A shows an exploded perspective view of the carrier bearing assembly 490, with the front face 451a oriented toward the viewer, and with the upper bracket component 450A disposed above the lower bracket component 450B to be rigidly coupled to the lower bracket 450B, such as with mechanical fasteners or threaded bolts 452, as shown in FIGS. 8B-8E. Overall dimensions of the carrier bearing 490 can be similar or identical to those discussed herein for similar carrier bearings.

FIG. 8A shows the first end 450a and the second 450b of the lower bracket component 450B optionally having different heights, while in other embodiments, the heights of the first end 450a and the second end 450b can be of the same height. In either event, the bracket 450 can comprise busing pairs 424A/424C and 424B/424D that can be similar or identical to what is shown, for example, with bushing pairs 24A/25A, 24B/25B, or any of the other bushing shown herein. In other instances, the bushings 424A and 424B can be used in isolation, without a corresponding bushing pair such as 424C and 424D, respectively. Similarly, the carrier bearing assembly 490 can also optionally comprise washers 423C and 423D, similar to washers 423A and 423B.

Figure 8B:
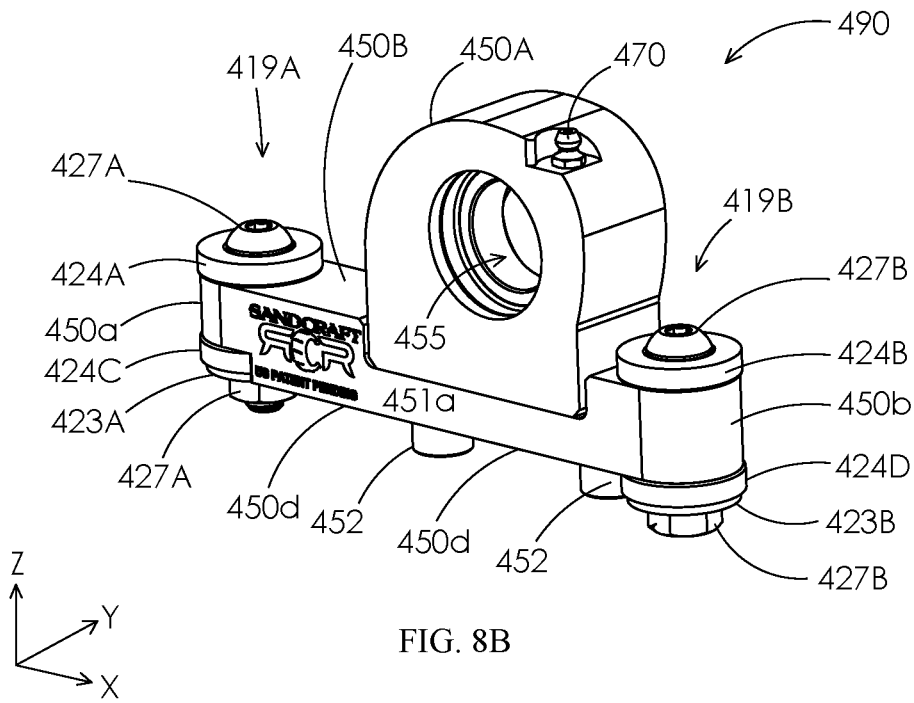

FIG. 8B shows an example of a non-exploded view of the carrier bearing assembly 490, similar to the view of the carrier bearing 490 shown in FIG. 8A. FIG. 8B additionally includes bearing shields 472 and 474 that can be disposed against or adjacent opposite sides of bearing 457 when the bearing and the bearing shields 472, 474 are disposed within the opening 455 in the bracket 450. The bearing shields 472, 474 can be made of metal, rubber, or other suitable material, and can keep trash, foreign debris, and undesired materials from contacting, contaminating, or harming the bearing 457, as described above with respect to bearing shields 472, 474.

Figure 8C:
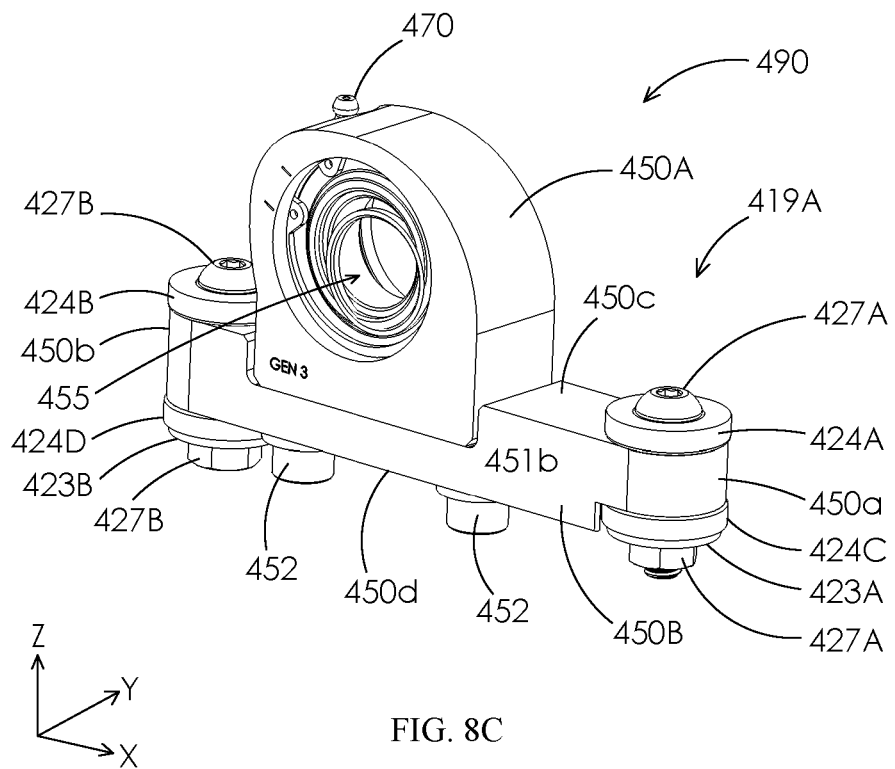

FIG. 8C shows an example of a non-exploded view of the carrier bearing assembly 490, similar to the view of the carrier bearing 490 shown in FIG. 8B, but with the back 451b of the bracket 450 or the carrier bearing assembly 490 oriented towards the viewer instead of the front 451a oriented towards the viewer.

FIG. 8D shows a rear profile view of the carrier bearing assembly 490 similar to the perspective view of FIG. 8C. In FIG. 8D, the curvature of sides of the upper integrally formed or machined bracket component 450A are shown, in which the angles or sloped sides of the upper component 450A can be seen to distinguish from the vertical sides of carrier-bearing 390 from FIG. 4C. While FIG. 8D shows the zerk 470 disposed towards the second end 450b of the bracket 450, the zerk 470 can also be disposed toward the first end 450 of the bracket 450. Similarly, the other zerks 170, 270, and 370, can be disposed at any desirable location along their respective brackets 150, 250, or 350, whether towards their first ends or their second ends.

FIG. 8E shows a sectional view of the carrier-bearing 490 taken along the section-line 8E-8E shown in FIG. 8D. FIG. 8E also includes a portion of a drive shaft 60 disposed in the opening 455 of the carrier-bearing 490.

Figure 8F:
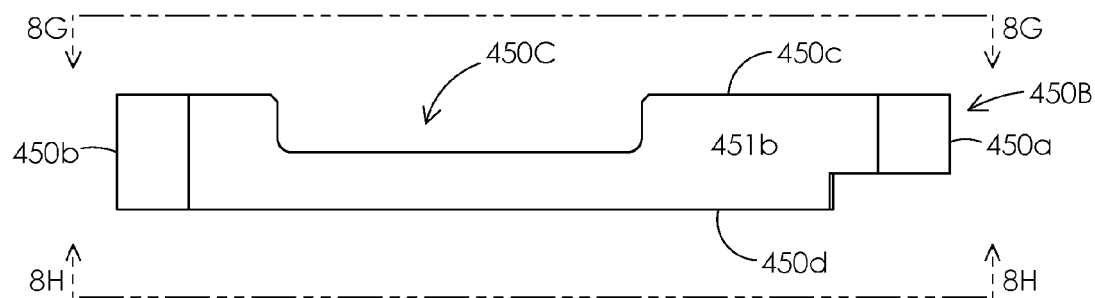
Figure 8G:
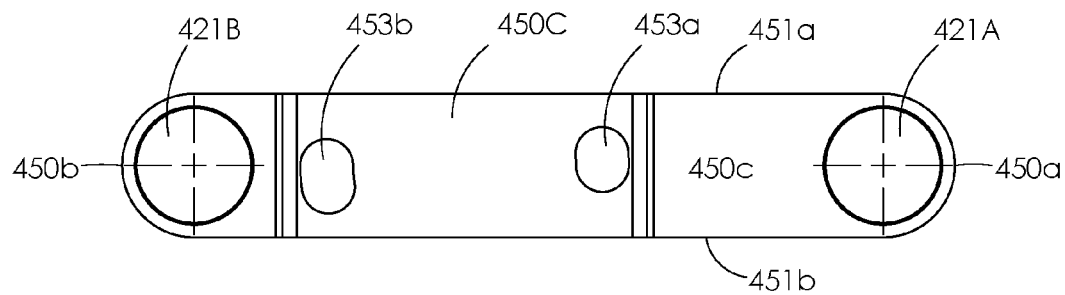
Figure 8H:
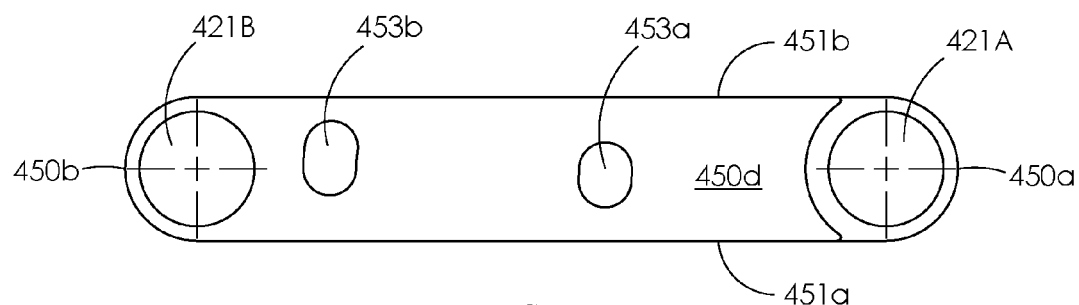

FIGS. 8F-8H shows additional detail of how the auto set angle of the carrier bearing assembly 490 can allow for positioning of the bearing 457 at a desired or advantageous angle with respect to the lower bracket component 450B and the frame 64, even using existing mounting holes 66A, 66B in the frame 64 to allow for the non-perpendicular angle (such as less than 89° and greater than 91°, or 85-89° or 91-95° between the drive shaft 60 and the carrier bearing 457 to be set without a need for fixed or desired angles for the bearing 457 to be machined into the bracket 450 or the upper housing 450A. Instead, the desired or relative angle can be achieved by at least one opening 453, such as openings 453a and 453b, being formed as slotted, curved, arced, or crescent shaped openings, as shown in FIGS. 8G and 8H.

FIG. 8F shows a back profile view of the lower bracket component 450B, similar to the view shown in FIG. 8D, but without, or separate from, the upper bracket component 450A. The lower bracket component 450B comprises an opening or recess 450C that facilitates the reception and coupling of the upper bracket component 450A to the lower bracket component 450B.

FIG. 8G shows a plan view of the top side 450c lower bracket component 450B taken along the section line 8G shown in FIG. 8F. FIG. 8G provides additional detail of the curved or crescent shape of openings 453 can allow the top piece 450A to move, slide, or rotate at an angle relative to the frame 64 and the original bolt holes 66A and 66B in the frame, while being coupled to the lower bracket component 450B with bolts or nuts 427, thereby changing the relative angle between the bearing 457 and the frame 64 or the UTV. In some instances, the slotted openings 453 can be of the same size, shape, or length, while in other instances the openings 453 can be different sizes, shapes, or lengths, such as with the a more elongate opening 453b and a less elongate opening 453a.

FIG. 8H shows a plan view of the bottom side 450d of the lower bracket component 450B taken along the section line 8H shown in FIG. 8F. FIG. 8H provides an opposing view of the additional detail shown in FIG. 8G.

FIGS. 9A-9G illustrate a greasable bearing 457 and bearing shield 472, 473 away from the carrier bearing assembly 490. While the reference numbers and description of the greasable bearing 457 are described with respect to the embodiment of the carrier bearing assembly 490 from FIGS. 8A-8E, the structure or principles of the greasable bearing 457 and bearing shield 472 can also be applied to the carrier bearing assemblies 90, 190, 290, and 390, or variations thereof, as shown in the other FIGs.

Figure 9A:
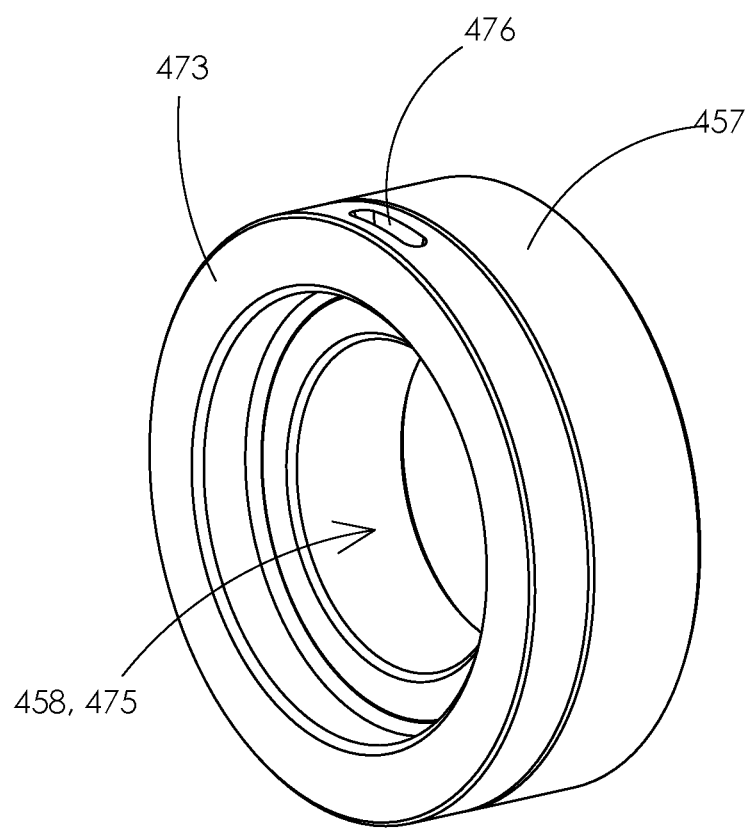

FIG. 9A shows a perspective view of the greasable bearing 457 and bearing shield 472, 473 disposed away from the carrier bearing assembly 490. In some instances a stock bearing shield 472 can be coupled, snapped, or threaded onto the bearing 456, while in other instances a custom bearing shield 473 can be coupled, snapped, or threaded onto the bearing 456. When a custom bearing shield 473 is used, the custom bearing shield can comprise an opening or hole 458 in bearing 457, and an opening or hole 475 in bearing shield 475 are shown extending through the respective pieces, to allow for the shaft 60 to pass or extend therethrough. The custom bearing shield 473 is shown comprising an intake, channel, shaft, or opening 476 extending from a first or outer end 476a of the intake 476 at an outer surface of the bearing shield 473, through the custom bearing shield 473, to an inner or second end 476b of the intake 476 disposed at an inner surface of the bearing shield 473, to provide access or ingress for a lubricant, such as grease that can be injected at the zerk 470, enter through o be intake 476, and surround ball bearings 460 within the bearing 457. The custom bearing shield can be made of, or include, any suitable material, such as materials similar or identical to bearing shield 472, including metal or plastic, such as Polytetrafluoroethylene (PTFE), which is a synthetic fluoropolymer of tetrafluoroethylene.

FIG. 9B shows a perspective view of the greasable bearing 457 and bearing shield 473 similar to view shown in FIG. 9A, but as an exploded view to show additional detail of the ball bearings 460 disposed within the bearing 457.

FIG. 9C shows a profile view of the greasable bearing 457 and bearing shield 473 coupled together, as shown in FIG. 9A, with the bearing shield 473 oriented towards the viewer. The section line 9D-9D shows the section line along which the view of FIG. 9D is taken.

FIG. 9D shows a cross-sectional profile view of the greasable bearing 457 and bearing shield 473 coupled together with the ingress of the intake 476 extending from an outer surface of the bearing shield 473 to the ball bearings 60 within the bearing 457.

Figure 9E:
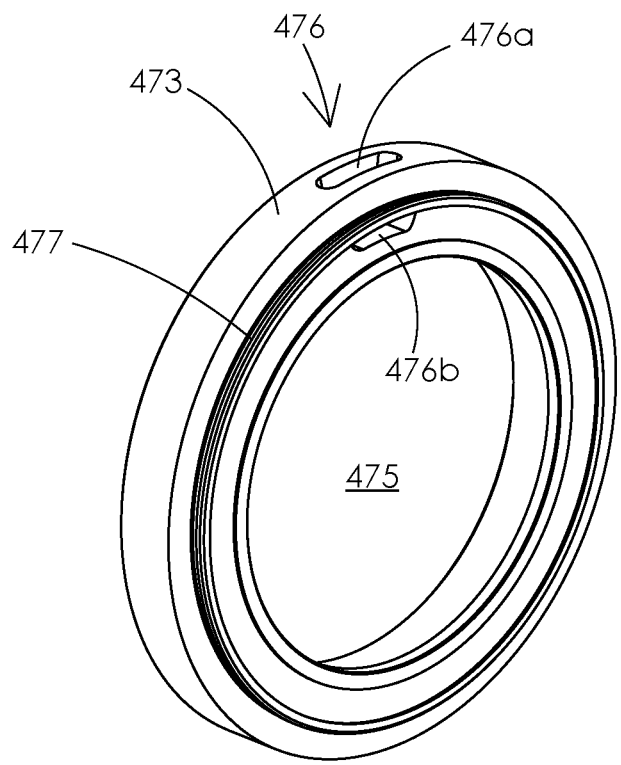

FIG. 9E shows a perspective view of the bearing shield 473 away from the bearing 457, and opposite the view shown in FIGS. 9A and 9B, with the backside of the bearing shield 473 being shown. The view of FIG. 9E shows a securing member, snap, threading, or lip 477 formed as part of the bearing shield 473 for coupling the bearing shield 473 to the bearing 457.

Figure 9F:
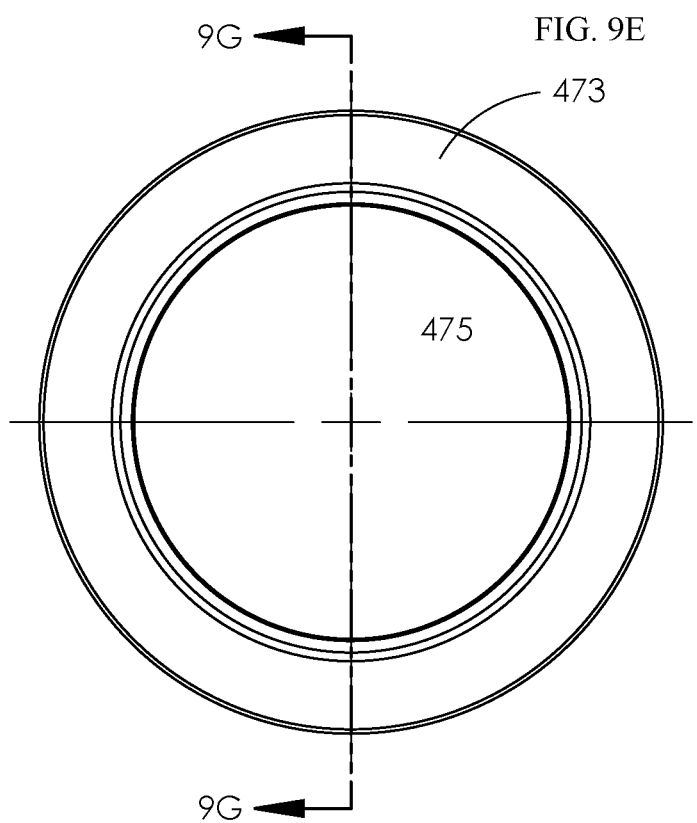
Figure 9G:
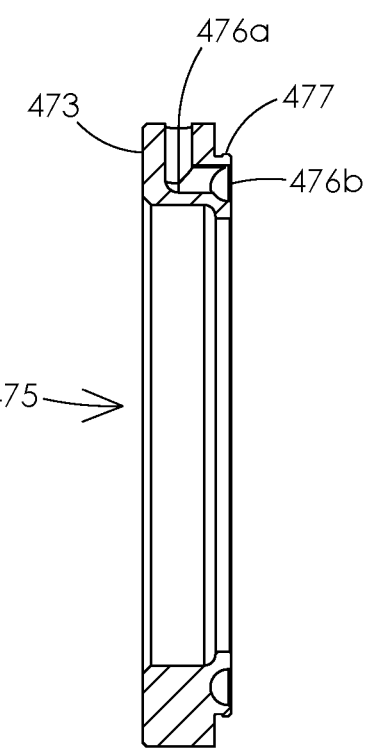

FIGS. 9F and 9G are similar to FIGS. 9C and 9D, respectively, but show the bearing shield 473 without the bearing 457. FIG. 9F shows a front profile view of the bearing shield 473 while FIG. 9G shows a cross-sectional profile view of the bearing shield 473 taken along the section line 9G-9G shown in FIG. 9F. Thus, the shield seal 473, which snaps into the roller bearing 457 allows the carrier bearing assembly 490 to be grease-able while still being able to use snap ring 459 and clamp collars on the shaft 60. By aligning the slot 476 in the seal 473 with the grease zerk 470 on the housing or bracket 450 and pressing the seal or shield 473 into place, the bearing 457 can conveniently provide for lubrication and improved performance without unpacking and repacking the bearing 457 with the carrier bearing assembly 490 removed.

Figure 10:
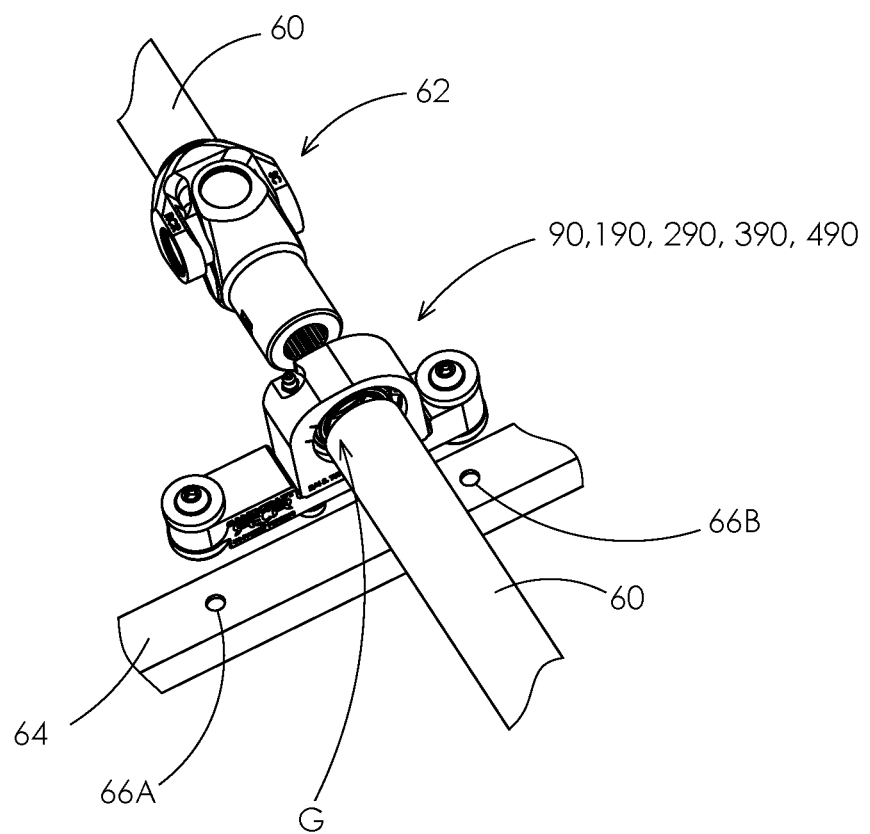
FIG. 10 illustrates a carrier bearing assembly coupled to a drive shaft.

FIG. 10 shows a carrier bearing assembly, such as carrier bearing assembly 390, that is used as a non-limiting example for ease of description; however, other carrier bearing assemblies, such as carrier barrier assembly 90, 190, 290, and 490, or variations thereof, could also be similarly situated on the drive shaft 60. The carrier bearing assembly 390 can then be fastened or bolted to the frame 64 of the UTV, with the openings or bolt holes 321A, 321B aligned with the openings 66A, 66B for the OEM carrier bearing 70 in the frame 64. In some instances, the alignment of the openings or bolt holes 321A, 321B will be directly aligned with the openings 66A, 66B for the OEM carrier bearing 70 without an intermediary members or adapters. In yet other instances, one or more intervening members or adapters can be used to adapt or align the openings or bolt holes 321A, 321B with the openings 66A, 66B for the OEM carrier bearing 70. In yet other instances, the openings or bolt holes 321A, 321B can be aligned with new or custom openings formed in the frame 64, rather than relying on one or more of the openings 66A, 66B for the OEM carrier bearing 70.

Where the above examples, embodiments and implementations reference examples, it should be understood by those of ordinary skill in the art that other manufacturing devices and examples could be intermixed or substituted with those provided. Accordingly, for example, although particular features may be disclosed, such components may comprise any shape, size, style, type, model, version, class, grade, measurement, concentration, material, weight, quantity, and/or the like consistent with the intended operation of a method and/or system implementation may be used. In places where the description above refers to particular implementations, it should be readily apparent that a number of modifications may be made without departing from the spirit thereof and that these implementations may be applied to other embodiments. Accordingly, the disclosed subject matter is intended to embrace all such alterations, modifications and variations that fall within the spirit and scope of the disclosure and the knowledge of one of ordinary skill in the art.

What is claimed is:

1. A carrier bearing assembly for bolting to a frame of a utility terrain vehicle (UTV), comprising:
    a bracket comprising a first end, a second end, a width W extending between the first end and the second end, a first face extending between the first end and the second end along the width W, and a second face opposite the first face extending between the first end and the second end along the width of the bracket;
    an opening formed completely through the bracket and extending from the first face to the second face, a centerline of the opening being at least 2.5 cm closer to the first end than the second end, and an angle between the centerline of the opening and a centerline of the bracket being in a range of 85-89° or 91-95°;
    a bearing friction fit in the opening in the bracket;
    a first mounting structure comprising a first bolt opening extending into the first end of the bracket and a first bolt for coupling to the frame of the UTV and extending into the first bolt opening; and
    a second mounting structure comprising a second bolt opening extending into the second end of the bracket and a second bolt for coupling to the frame of the UTV and extending into the second bolt opening, wherein the centerline of the bracket passes through a center of the first opening and a center of the second opening.

2. The carrier bearing assembly of claim 1, wherein the angle between the centerline of the opening and the first face of the bracket is in a range of 85-89° or 91-95°.

3. The carrier bearing assembly of claim 1, wherein the first face of the bracket comprises a bend comprising an angle greater than 1°, the bend being offset from the opening.

4. The carrier bearing assembly of claim 1, wherein the bracket comprises a machined bracket formed as single, unitary block of metal.

5. The carrier bearing assembly of claim 1, wherein the bracket comprises an upper integrally formed machined bracket component and a lower integrally formed machined bracket component.

6. The carrier bearing assembly of claim 1, further comprising a zerk that allows the carrier bearing assembly to be greased while in use.

7. The carrier bearing assembly of claim 1, wherein a gap of no more than 0.254 millimeters exists between an inner surface of an opening in the bearing and an outer surface of a driveshaft disposed through the opening in the bearing.

8. A carrier bearing assembly for bolting to a frame of a utility terrain vehicle (UTV), comprising:
   a bracket comprising a first end, a second end, a width W extending between the first end and the second end, a first face extending between the first end and the second end along the length of the width W, and a second face opposite the first face extending between the first end and the second end along the width of the bracket;
   an opening formed completely through the bracket and extending from the first face to the second face, and an angle between a centerline of the opening and a centerline of the bracket being in a range of 85-89° or 91-95°;
   a first mounting structure offset from the opening for coupling the carrier bearing assembly to the frame of the UTV; and
   a second mounting structure offset from the opening for coupling the carrier bearing assembly to the frame of the UTV, and
   wherein the centerline of the bracket passes through a center of the first mounting structure and a center of the second mounting structure.

9. The carrier bearing assembly of claim 8, wherein the angle between the centerline of the opening and the first face of the bracket, is in a range of 85-89° or 91-95°.

10. The carrier bearing assembly of claim 8, wherein the bracket comprises a machined bracket.

11. The carrier bearing assembly of claim 8, further comprising:
    a bearing fit in the opening in the bracket; and
    a gap of no more than 0.254 millimeters exists between an inner surface of an opening in the bearing and an outer surface of a driveshaft disposed through the opening in the bearing.

12. The carrier bearing assembly of claim 11, further comprising a rubber bushing configured to be disposed between the bracket and the frame of the UTV.

13. The carrier bearing assembly of claim 8, wherein the carrier bearing is fastened over or under the frame of the UTV.

14. The carrier bearing assembly of claim 8, further comprising a zerk that allows the carrier bearing assembly to be greased while in use.

15. The carrier bearing assembly of claim 8, wherein:
    the first mounting structure comprises a first opening through the bracket and a first bolt disposed through the first opening, the first bolt being adapted to be aligned with a first hole in the frame of the UTV; and
    the second mounting structure comprises a second opening through the bracket and a second bolt disposed through the second opening, the second bolt being adapted to be aligned with a second hole in the frame of the UTV,
    wherein a center of the first mounting structure is defined by a center of the first bolt, and
    wherein a center of the second mounting structure is defined by a center of the second bolt.

* * * * *